United States Patent
Padaki et al.

(10) Patent No.: US 12,352,879 B1
(45) Date of Patent: Jul. 8, 2025

(54) EXPANDING ANGLE-OF-ARRIVAL (AOA) COVERAGE WITH SWITCHING BETWEEN THREE OR MORE ANTENNAS FOR ULTRA-WIDEBAND (UWB) DEVICES

(71) Applicant: Amazon Technologies, Inc., Seattle, WA (US)

(72) Inventors: Aditya V. Padaki, Richardson, TX (US); Sai Prashanth Chinnapalli, Dublin, CA (US)

(73) Assignee: Amazon Technologies, Inc., Seattle, WA (US)

( * ) Notice: Subject to any disclaimer, the term of this patent is extended or adjusted under 35 U.S.C. 154(b) by 574 days.

(21) Appl. No.: 17/699,957

(22) Filed: Mar. 21, 2022

Related U.S. Application Data

(60) Provisional application No. 63/237,046, filed on Aug. 25, 2021.

(51) Int. Cl.
*G01S 5/02* (2010.01)
*G01S 3/46* (2006.01)
*H04W 64/00* (2009.01)

(52) U.S. Cl.
CPC .............. *G01S 5/0284* (2013.01); *G01S 3/46* (2013.01); *H04W 64/006* (2013.01)

(58) Field of Classification Search
CPC .. G01S 13/765; G01S 13/0209; G01S 1/0428; G01S 13/02; G01S 13/343; G01S 13/74; G01S 13/76; G01S 13/87; G01S 2205/01; G01S 3/12; G01S 3/14; G01S 3/46; G01S 3/48; G01S 5/0009; G01S 5/0218; G01S 5/0284; G01S 5/04; G01S 5/12; G01S 7/00; G01S 7/025; G01S 7/026; H04W 4/80; H04W 4/02; H04W 4/023; H04W 48/16; H04W 8/005; H04W 4/40; H04W 4/70; H04W 48/08; H04W 48/10;

(Continued)

(56) References Cited

U.S. PATENT DOCUMENTS 6,917,820 B2 * 7/2005 Gore .................... H04B 7/0691
455/562.1
8,483,185 B2 * 7/2013 Hottinen ............... H04L 1/0618
455/24

(Continued)

FOREIGN PATENT DOCUMENTS

WO  WO-2011123065 A1 * 10/2011 ............... G01S 5/04

*Primary Examiner* — Matthew C Sams
(74) *Attorney, Agent, or Firm* — Lowenstein Sandler LLP

(57) ABSTRACT

Technologies directed to using at least three antennas and Ultra-Wideband (UWB) protocols are described. One method includes sending a first signal to a second wireless device with data that cause it to send a second signal at a plurality of times. The method receives copies of the second signal at a first time via a first pair of antennas and copies of the second signal at a second time via a second pair of antennas. The method determines first and second angle-of-arrival (AoA) values from the copies of the second signals at the first and second times, respectively. The method determines location information of the second wireless device, the location information including an identifier corresponding to a first field of view (FOV) corresponding to the first pair or a second FOV corresponding to the second pair and at least one of the first AoA value or the second AoA value.

20 Claims, 28 Drawing Sheets

(58) Field of Classification Search
CPC ... H04W 48/14; H04W 64/00; H04W 64/006; H04W 74/002; H04W 74/08; H04W 74/0833; H04W 80/10; H04W 88/08; H04B 1/7163; H04B 1/69; H04B 2201/71634; H04B 7/0404; H04B 7/086
See application file for complete search history.

(56) References Cited

U.S. PATENT DOCUMENTS

| | | | |
|---|---|---|---|
| 2005/0084031 A1* | 4/2005 | Rosen | H04B 1/69 |
| | | | 375/295 |
| 2020/0014099 A1* | 1/2020 | Ghabra | G01S 3/48 |
| 2020/0137676 A1* | 4/2020 | Yoon | H04W 64/006 |
| 2020/0225341 A1* | 7/2020 | Li | H04W 72/0446 |
| 2020/0287959 A1* | 9/2020 | Li | H04W 48/16 |
| 2022/0353633 A1* | 11/2022 | Kim | H04W 4/02 |
| 2022/0397659 A1* | 12/2022 | Ha | H04W 8/005 |
| 2022/0404448 A1* | 12/2022 | Koo | G01S 1/0428 |

\* cited by examiner

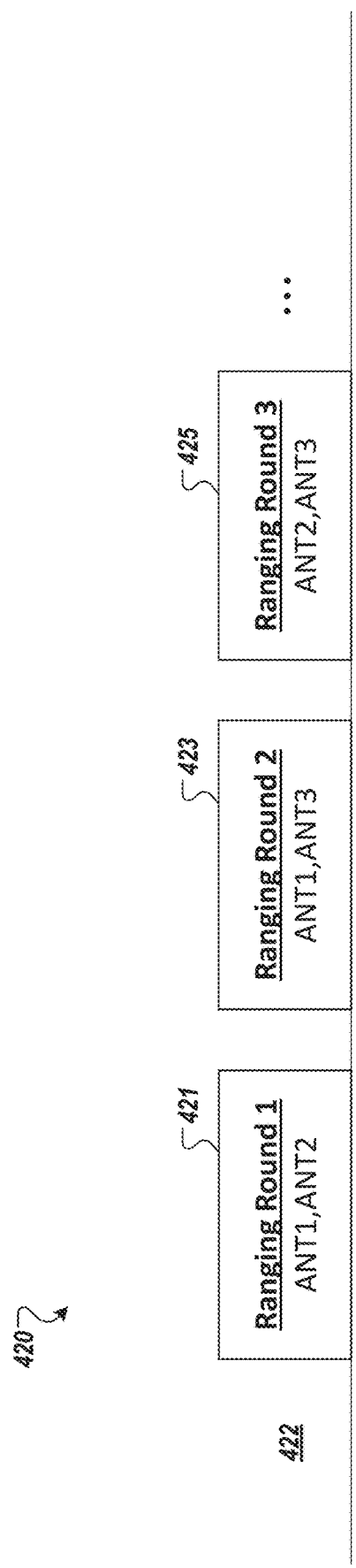

000
EXPANDING ANGLE-OF-ARRIVAL (AOA) COVERAGE WITH SWITCHING BETWEEN THREE OR MORE ANTENNAS FOR ULTRA-WIDEBAND (UWB) DEVICES

RELATED APPLICATION

This application claims the benefit of U.S. Provisional Application No. 63/237,046, filed on Aug. 25, 2021, the entire content of which is hereby incorporated by reference herein.

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, personal digital assistants (PDAs), portable media players, tablet computers, netbooks, laptops, and the like. These electronic devices wirelessly communicate with a communications infrastructure to enable the consumption of digital media items. In order to wirelessly communicate with other devices, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 4C is a timing diagram of a schedule for obtaining AoA values in different ranging rounds of a same session, according to at least one embodiment.

DETAILED DESCRIPTION

Figure 1:
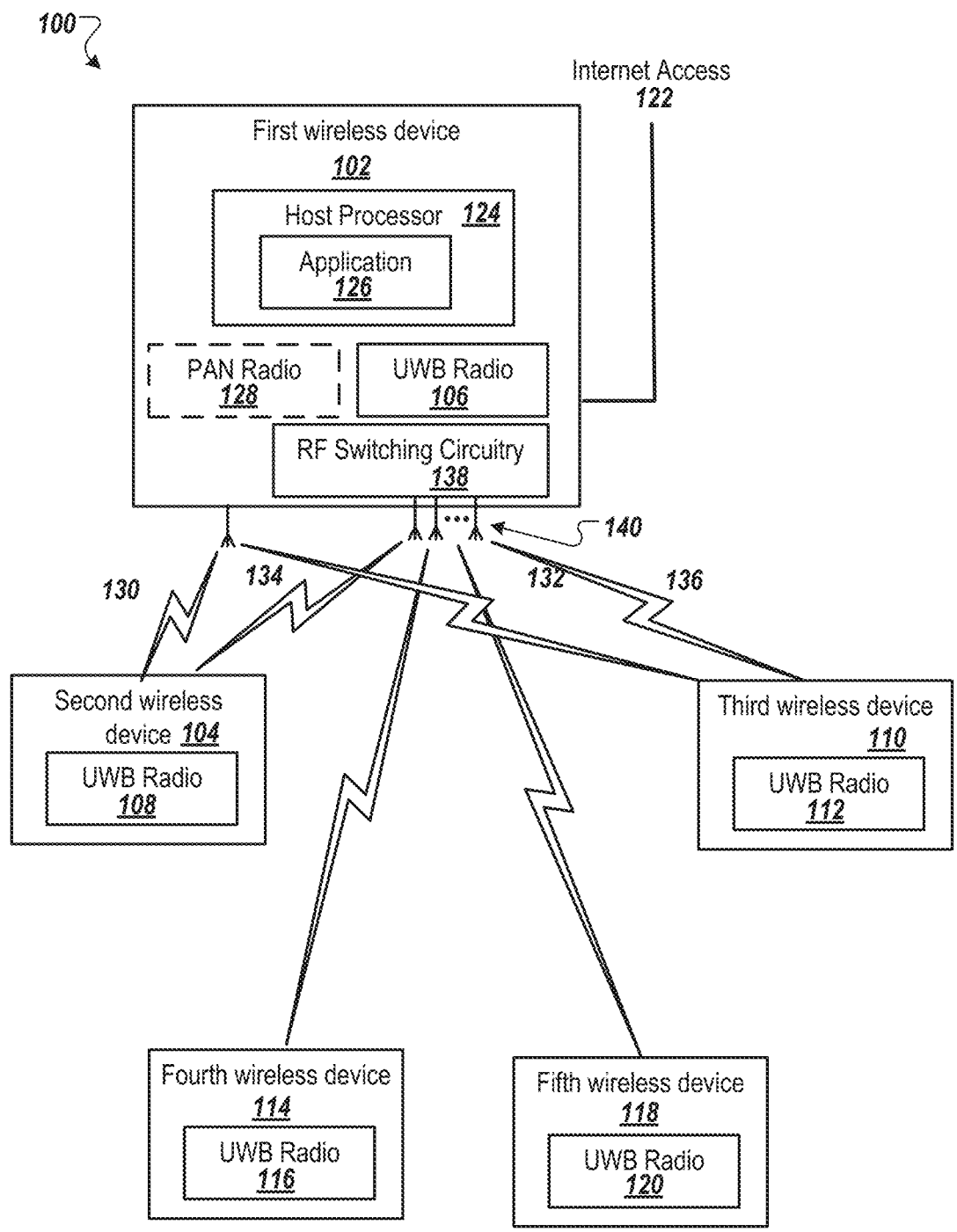
FIG. 1 is a network diagram of a wireless network with a first wireless device with a host processor and an ultra-wideband (UWB) radio for expanding angle-of-arrival (AoA) coverage of an environment of the first wireless device according to at least one embodiment.

Technologies directed to data transfer protocols for Ultra-Wideband (UWB) are described. UWB is a radio technology that can use low energy levels for short-range, high-bandwidth (e.g., greater than 500 MHz or 20% of the arithmetic center frequency) communications over a large portion of the radio spectrum. The FCC authorizes the unlicensed use of UWB in the frequency range of 3.2 to 10.6 GHz. The high bandwidth allows for the transmission of a large amount of signal energy without interfering with narrowband and carrier wave transmission in the same frequency band. In many cases, multiple devices in a wireless network use the same wireless channel or adjacent wireless channels. Existing solutions measure the Angle-of-Arrival of a TX signal with two antennas. A FOV provided by two antennas is typically limited to 120 degrees because of antenna constraints. So, if a UWB tag device (also referred to as "target device") were to transmit the TX signal from outside of the 120-degree FOV of the two antennas of a UWB anchor device, the fidelity of AoA measurements is lost, and coverage to measure AoA is not available. This is observed as a loss of signal or erroneous AoA reports. Existing solutions are inadequate for devices with greater coverage requirements, like 240 degrees or 360 degrees FOV. For stationary or fixed devices that are not handheld or those that do not have rotation platforms, the coverage on AoA is increased by using more than two antennas. Existing UWB modules typically only include two receiver (RX) chains or fewer RX chains than antennas. An anchor device needs to switch between the pairs to know the sector and AoA of a tag device. A sector is a portion of an environment surrounding the anchor device in which the tag device is located. Presently, the UWB protocol and the UWB framework do not include technology to switch between pairs of antennas to cover greater than 120-degree FOV provided by two antennas or multiple sectors in different directions from the anchor device.

Aspects of the present disclosure address the above and other deficiencies by providing at least three antennas and functionality to switch between different pairs of the at least three antennas to extend coverage beyond the FOV provided by only two antennas. As noted above, even using two RX chains or a number of chains less than the number of antennas, aspects of the present disclosure can be used to determine a sector and an AoA of a tag device by switching between different pairs of the at least three antennas. Aspects of the present disclosure provide protocols and framework to switch between different antenna pairs of at least three antennas of a UWB device to cover greater than 120-degree FOV provided by only two antennas. Aspects of the present disclosure provide protocols and a framework to switch between different antenna pairs of at least three antennas of a UWB device to cover multiple sectors in different directions from the UWB device. Aspects of the present disclosure include technologies at a protocol level and a device software level or algorithm level. One method includes a first wireless device sending a first signal to a second wireless device with data that cause it to send a second signal multiple times so that the first wireless device can measure and compute AoA values using different pairs of antennas. The method receives, by a first pair of antennas, copies of the second signal at a first time and receives, by a second pair of antennas, copies of the second signal at a second time. The first pair has a first FOV covering a first portion of an environment and the second pair has a second FOV covering a second portion of the environment. The method determines first and second angle-of-arrival (AoA) values from the second signals at the first and second times, respectively. The method determines an identifier corresponding to the first FOV or second FOV in which the second device is located. Aspects of the present disclosure can be used in connection with other radio technologies, including wireless local area network (WLAN) (e.g., Wi-Fi® technology) and wireless personal area network (PAN) technologies (e.g., Bluetooth® and Bluetooth® Low Energy (BLE)). It should be noted that the various embodiments leverage terminology from existing specifications for ranging rounds (OWR, multi-mode, DS-TWR, M2M, etc.), but in other embodiments, the same functionality can be achieved by defining new types of ranging rounds.

FIG. 1 is a network diagram of a wireless network 100 with a first wireless device 102 with a host processor 124 and a UWB radio 106 for expanding angle-of-arrival (AoA) coverage of an environment of the first wireless device 102, according to at least one embodiment. In this embodiment, the first wireless device 102 provides backhaul connectivity to wireless network 100, such as using a wired or wireless connection 122 to the Internet. For example, the first wireless device 102 can be connected to a gateway or a modem via wired or wireless connection 122. Alternatively, the first wireless device 102 can be a router or a gateway and can provide internet access to a second wireless device 104, a third wireless device 110, a fourth wireless device 114, and a fifth wireless device 118, described below. First wireless device 102 can provide an access point to wireless devices 104, 110, 114, 118, and other devices. The wireless devices 104, 110, 114, 118 can be endpoint devices, client devices, or stations (STAs). In at least one embodiment, the first wireless device 102 is a controller, and the wireless devices 104, 110, 114, and 118 are controlees. In at least one embodiment, the first wireless device 102 fetches data from the Internet and distributes the data over the air to the four devices 104, 110, 114, 118. In other embodiments, the first wireless device 102 communicates with more or fewer devices than four.

In at least one embodiment, the first wireless device 102 is a camera device, such as a doorbell device. The camera device can transfer data to other wireless devices in a wireless network. A camera device can capture video and audio. For example, the camera device can detect a motion event and alert the other devices quickly without going through a cloud service. In another example, one of the other devices can detect an event and report the event to the controller, and the controller can notify all controlees of the detected event. In other embodiments, one or more wireless devices 102, 104, 110, 114, and 118 can be a computer, a smart phone, a voice-controlled device, a wireless display, a wireless speaker, a game console, a wireless game pad, or the like.

In at least one embodiment, the first wireless device 102 includes a host processor 124 and a UWB radio 106. The UWB radio 106 includes a UWB module that can send data to one or more wireless devices using a UWB protocol and receive data to one or more wireless devices using the UWB protocol. The UWB module can generate and send various types of ranging messages, such as a ranging control message (RCM). The RCM can be sent as a broadcast frame or a multicast frame. The RCM can include information that defines how the first wireless device 102 is scheduled to send the data to one or more other wireless devices or how the one or more other wireless devices are scheduled to send the data to the first wireless device 102. The RCM can include a slot schedule or other data that causes another wireless device to respond with one or more ranging messages, such as a ranging initiation message (RIM). A ranging block is a time period for ranging and includes a whole number of ranging rounds, where a ranging round is a period of sufficient duration to complete one entire range-measurement cycle. Each ranging round is subdivided into an integer number of ranging slots, where a ranging slot is a time period of sufficient duration for the transmission of at least one ranging frame. The slot duration and the number of slots make up a ranging round. These can be changed between ranging rounds using a subsequent RCM. In some cases, the third wireless device 110, the fourth wireless device 114, and the fifth wireless device 118 include UWB radios and receive the first RCM. The first RCM can be used by the other wireless devices to determine when the first wireless device 102 is sending ranging messages to the respective wireless device or when the respective device is sending ranging messages to the first wireless device 102. In at least one embodiment, the ranging messages are defined in the UWB standards (e.g., FiRa-UWB/IEEE 802.15.4z).

In at least one embodiment, the host processor 124 can execute an application 126 that requests a location of the second wireless device 104. The requested location can be provided as an identifier corresponding to a portion of the environment in which the second wireless device 104 is located and an AoA value of signals received from the second wireless device 104. For example, the first wireless device 102 can be a UWB anchor device, and the wireless devices 102, 104, 110, 114, and 118 can be UWB tag devices. A UWB anchor device is an electronic device that detects UWB pulses emitted by UWB tag devices. The UWB anchor device can forward information about the UWB pulses to a location server for calculating a location of the UWB tag devices. The UWB anchor devices can be installed in an area to create a location infrastructure. The UWB tag devices can be located in an environment around the UWB anchor device. The UWB tag devices are small electronic devices that can be attached to objects that need to be tracked. The UWB tag devices send out UWB pulses that are received by the UWB anchor devices. The UWB module of the UWB radio 106 can be coupled to RF switching circuitry 138, which is coupled to at least three antennas 140. Instead of existing solutions that use two antennas to measure AoA of tag devices, resulting in 120 degrees coverage area, i.e., a fraction of 360 degrees or 240 degrees required by the application 126, the UWB radio 106 can use the RF switching circuitry 138 to switch successively between different pairs of the at least three antennas 140 to determine an AoA of a tag in an area greater than 120 degrees with only two antennas. The UWB radio 106 can use the RF switching circuitry 138 and at least three antennas 140 to measure multiple AoA values to achieve a coverage area greater than 120 degrees up to 360 degrees.

In at least one embodiment, the first wireless device 102 is a UWB anchor device that includes the host processor 124 that executes application 126 that requests a location (e.g., an AoA value) of a UWB tag device located in an environment around the UWB anchor device. A UWB module of the UWB anchor device is coupled to the host processor 124 using a UCI and coupled to the RF switching circuitry 138. The UWB module receives a first command from the host processor 124 via the UCI. The first command includes a first indication of a first pair of two of the at least three antennas. The first pair has a first FOV covering 120 degrees of the environment. The UWB module sends a message to the UWB tag device to send successive messages to the UWB module, each successive message at one of a set of multiple time slots. The UWB module controls the RF switching circuitry 138 to couple a first antenna of the first pair to the first RX chain and a second antenna of the first pair to the second RX chain at a beginning of a first time slot of the set of multiple time slots. The UWB module receives, via the first pair during the first time slot, one of the successive messages from the UWB tag device. The UWB module determines a first AoA value of the UWB tag device using the one message received from the UWB tag device via the first pair during the first time slot. The UWB module receives a second command from the host processor 124 via the UCI. The second command includes a second indication of a second pair of two of the at least three antennas. The second pair is different than the first pair and has a second FOV covering 120 degrees of the environment. For example, the second pair has one or two different antennas than in the first pair. The UWB module controls the RF switching circuitry 138 to couple a first antenna of a second pair to the first RX chain and a second antenna of the second pair to the second RX chain at a beginning of a second time slot of the set of multiple time slots. The UWB module receives, via the second pair during the second time slot, one of the successive messages from the UWB tag device. The UWB module determines a second AoA value of the UWB tag device using the one message received from the UWB tag device via the second pair during the second time slot. The UWB module determines location information of the UWB tag in the environment using the first AoA value and the second AoA value. The location information can include an identifier corresponding to the first FOV or the second FOV in which the UWB tag device is located and at least one of the first AoA value or the second AoA value. In at least one embodiment, the UWB module selects one of the first AoA value or the second AoA value based on multiple factors, including signal parameters, AoA values being within an expected range, or the like. In at least one embodiment, the UWB module determines, using the first AoA value and the second AoA value, an identifier corresponding to the first FOV or the second FOV in which the UWB tag device is located. The UWB module sends the location information to the host processor 124.

In a further embodiment, there are six antennas, and the RF switching circuitry 138 is coupled between the UWB module and the six antennas. In this embodiment, the UWB module receives the first and second commands and receives a third command from the host processor 124 via the UCI. The third command includes a third indication of a third pair of two of the six antennas. The first pair has a third FOV covering 120 degrees of the environment. The UWB module controls the RF switching circuitry 138 to couple a first antenna of a third pair to the first RX chain and a second antenna of the third pair to the second RX chain at a beginning of a third time slot of the set of multiple time slots. The UWB module receives, via the third pair during the third time slot, one of the successive messages from the UWB tag device. The UWB module determines a third AoA value of the UWB tag device using the one message received from the UWB tag device via the third pair during the third time slot. The UWB module determines the location information using the first AoA value, the second AoA value, and the third AoA value. The location information can include the identifier corresponding to the first FOV, the second FOV, or the third FOV in which the UWB tag device is location and at least one of the first AoA value, the second AoA value, or the third AoA value. The UWB module sends the location information to the host processor 124. In at least one embodiment, the first FOV, the second FOV, and the third FOV cover 360 degrees of the environment.

In at least one embodiment, the UWB module can send a first signal to the second wireless device 104. The first data can cause the second wireless device 104 to send a second signal multiple times. The UWB module can cause the RF switching circuitry 138 to couple a first pair of antennas 140 to the UWB module at a first time to receive a first copy and a second copy of the second signal sent by the second wireless device 104 at the first time. The UWB module can determine a first AoA value using a first phase difference of arrival between the copies of the second signal sent by the second wireless device 104 at the first time. The UWB module can cause the RF switching circuitry 138 to couple a second pair of antennas 140 to the UWB module at a second time to receive a third copy and a fourth copy of the second signal sent by the second wireless device 104 the second time. The UWB module can determine a second AoA value using a second phase difference of arrival between the copies of the second signal sent by the second wireless device 104 at the second time. The UWB module can send at least one of the first AoA value or the second AoA value to the host processor 124. The UWB module can determine, using the first AoA value and the second AoA value, an identifier corresponding to either a first FOV or a second FOV in which the second wireless device is located, the first FOV corresponding to the first pair and the second FOV corresponding to the second pair. The first FOV can cover a first portion (e.g., 120 degrees) of the environment around the first wireless device 102, and the second FOV can cover a second portion (e.g., 120 degrees) of the environment around the first wireless device 102. In at least one embodiment, the first portion and the second portion cover different portions of the environment and do not overlap, such as illustrated in FIG. 2F. In at least one embodiment, the first portion and the second portion partially overlap, such as illustrated in FIGS. 2D-2E.

In at least one embodiment, the UWB radio receives one or more commands from the host processor 124 over a UWB command interface (UCI). The one or more commands can have configuration information, such as ranging session configurations, ranging block configurations, ranging round configuration, ranging slot configurations, or the like, as described in more detail below with respect to FIGS. 3-5B. In at least one embodiment, application 126 is an access point (AP) host and is the next higher layer to the UWB media access control (MAC) layer in the UWB protocol. The AP host can send commands to designate different antenna pairs at different times based on a specified schedule to measure multiple AoA values to determine whether a tag device is located in a sector (e.g., a portion of the environment) corresponding to the specified antenna pair and an AoA value of a signal received from the tag device in that sector.

As described above, since there are only two antenna and two RX channels, there are no UWB protocols for selecting different antenna pairs. Previously, antenna selection could only be made for each ranging session in which one ranging round could return the AoA value from a single antenna pair. Another ranging session could potentially change the antenna pair and include another ranging round that could return an AoA value from the different antenna pairs. Previously, multiple AoA values from different antenna pairs in a same ranging round or a same ranging session were not possible. As described herein, the embodiments of the UWB module described herein can select different antenna pairs on a ranging session basis, a ranging block basis, or a ranging round basis, as described herein. For example, one ranging round can return an AoA value from a first antenna pair and an AoA value from a second antenna pair, where the antenna switching can happen during the same message. This can be done using commands from the AP host using configuration information over the UCI to the UWB MAC layer, such as illustrated in the example of FIG. 2A.

Figure 2A:
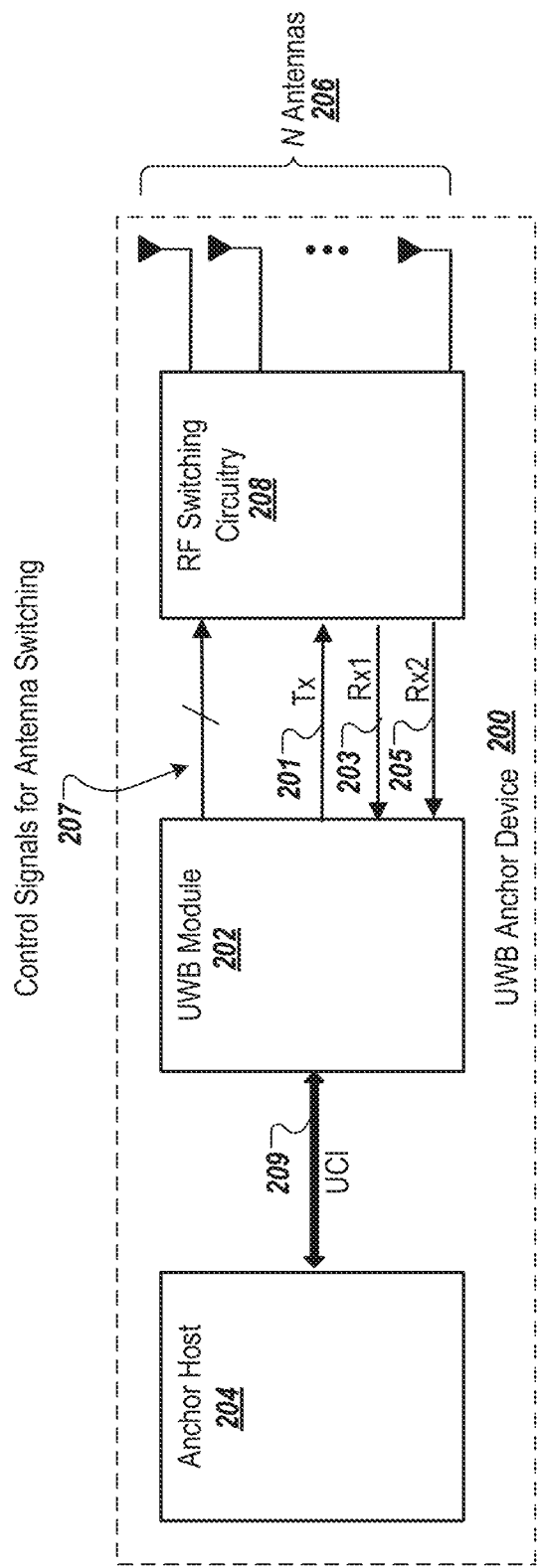
FIG. 2A is a block diagram of a UWB anchor device with a UWB module, an anchor host, N antennas, and radio frequency (RF) switching circuitry, according to at least one embodiment.
Figure 2B:
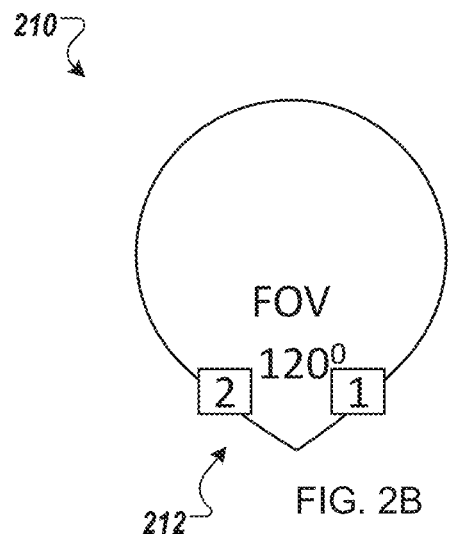
FIG. 2B illustrates a field of view (FOV) of a single antenna pair according to at least one embodiment.

FIG. 2A is a block diagram of a UWB anchor device 200 with a UWB module 202, an anchor host 204, N antennas 206, and RF switching circuitry 208, according to at least one embodiment. UWB module 202 is coupled to anchor host 204 with a UCI 209. The UWB module 202 receives one or more commands via UCI 209, as described in more detail below. The UWB module 202 is coupled to RF switching circuitry 208 via one or more signal lines. The UWB module 202 can send a TX signal 201 via a first signal line, receive a first receive (RX) signal 203 via a second signal line, receive a second RX signal 205 via a third signal line, and send one or more control signals 207 via one or more control lines. The UWB module 202 can control the RF switching circuitry 208 using one or more control signals 207 to select different antenna pairs of the N antennas 206, where N is a positive integer greater than two. The UWB module 202 can cause the RF switching circuitry 208 to couple the selected antenna pair to RX signal lines to measure an AoA value of the antenna pair. As described herein, a single antenna pair has a FOV of 120 degrees, as illustrated in FIG. 2B, because the single antenna pair is limited to approximately 120 degrees because of antenna constraints, as described below with respect to FIG. 2C. An effective FOV of the UWB anchor device 200 can be increased by selecting different antenna pairs, as illustrated in FIGS. 2D that shows two antenna pairs (A-C and B-A), FIG. 2E that shows four antenna pairs (A-B, A-D, D-C, and C-B), and FIG. 2F that shows three antenna pairs (1A-1B, 2A-2B, and 3A-3B).

FIG. 2B illustrates a FOV 210 of a single antenna pair 212 according to at least one embodiment. The FOV 210 is limited to approximately 120 degrees, as described below with respect to FIG. 2C.

Figure 2C:
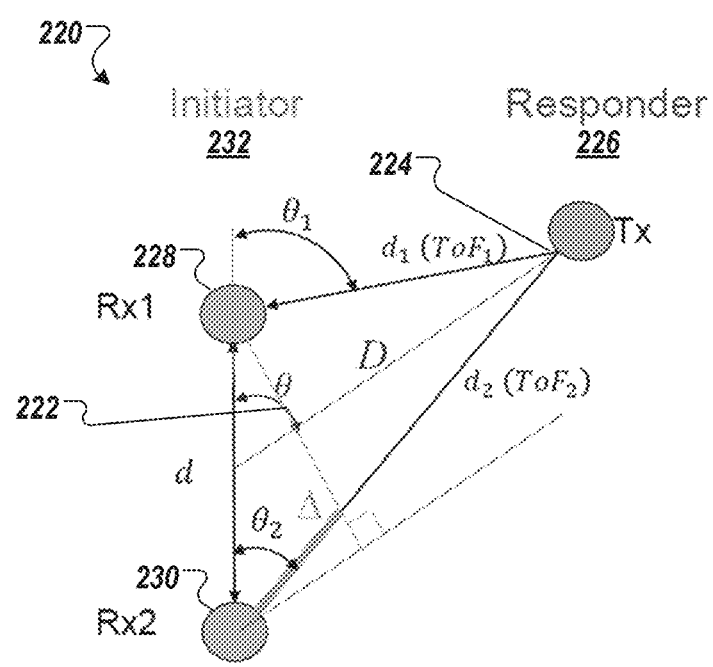
FIG. 2C is a graph illustrating an angle of arrival of a transmit (TX) signal sent by a responder and received by a first antenna and a second antenna of an initiator, according to at least one embodiment.
Figure 2F:
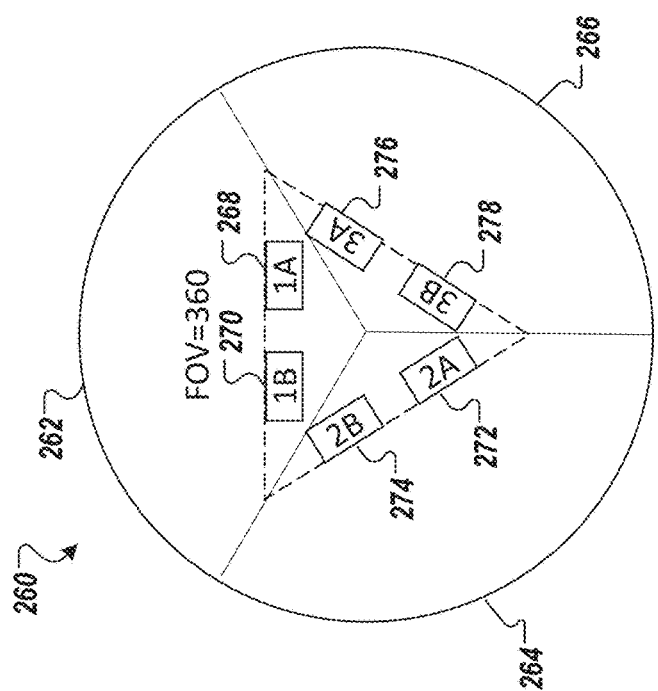
FIG. 2F illustrates an effective FOV of three FOVs of three antenna pairs of six antennas, according to at least one embodiment.
Figure 2E:
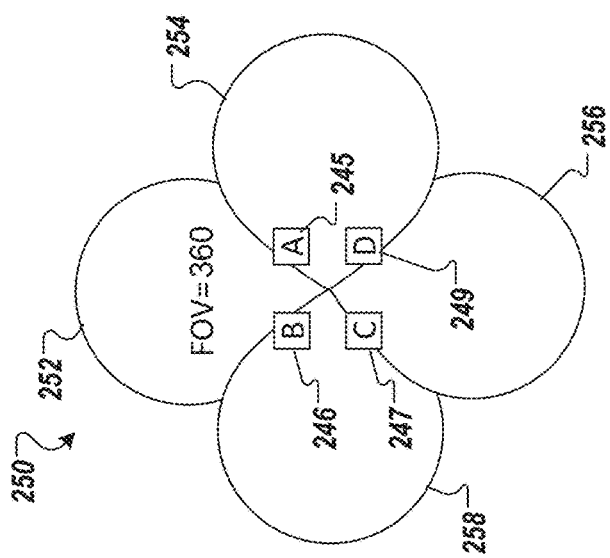
FIG. 2E illustrates an effective FOV of four FOVs of four antenna pairs of four antennas, according to at least one embodiment.
Figure 2D:
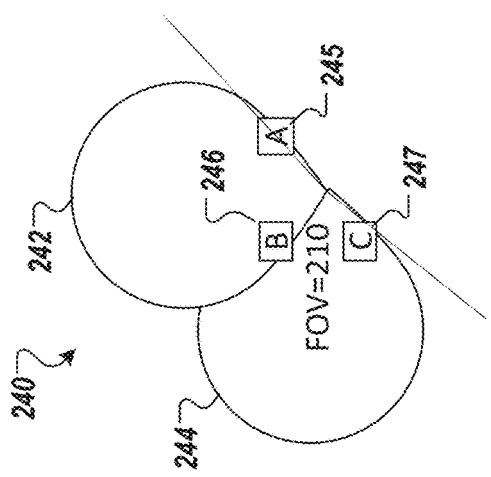
FIG. 2D illustrates an effective FOV of three antennas with two FOVs of two antenna pairs of three antennas, according to at least one embodiment.

FIG. 2C is a graph 220 illustrating an angle of arrival (AoA) 222 of a TX signal 224 sent by a responder 226 and received by a first antenna 228 and a second antenna 230 of an initiator 232, according to at least one embodiment. AoA 222 is the angle at which the TX signal 224 is received at initiator 232 (receiver) and is based on the principle of measuring angular directions from responder 226 (transmitter) at a specified location. For determining AoA 222, the distance, d, between the first and second antennas 228, 230 is known. The AoA 222 can be measured by computing the phase differences (or time differences) of the receiving radio signals. In at least one embodiment, the AoA 222 can be calculated by measuring a time difference of arrival (TDOA) between individual antennas (or antenna elements of an array of elements). TDOA is the time difference between two times of arrival (TOAs), each representing an absolute time instant when TX signal 224 by responder 226 (transmitter) reaches the initiator 232 (receiver). In at least one embodiment, the AoA 222 can be calculated by measuring a first time of flight (TOF) (labeled "ToF1") of the TX signal 224 sent by responder 226 (transmitter) reaches the initiator 232 (receiver) and a second TOF (labeled "ToF2") of the TX signal 224 sent by responder 226 (transmitter) reaches the initiator 232 (receiver). In at least one embodiment, the initiator 232 determines AoA 222 (AoA value) using a first phase difference of arrival between the copies of TX signal 224 sent by the responder 226.

As described above, the single antenna pair of the first and second antennas 228, 230 are limited to the FOV 210 of 120 degrees. So, selecting different antenna pairs of at least three antennas of initiator 232 can increase an effective FOV of the initiator 232, as illustrated in FIG. 2D that shows two antenna pairs (A-C and B-A), FIG. 2E that shows four antenna pairs (A-B, A-D, D-C, and C-B), and FIG. 2F that shows three antenna pairs (1A-1B, 2A-2B, and 3A-3B).

FIG. 2D illustrates an effective FOV 240 of two FOVs 242, 244 of two antenna pairs of three antennas 245, 246, 247, according to at least one embodiment. The effective FOV 240 is expanded to be greater than 120 degrees of FOV 210 using three antennas 245, 246, 247. In at least one embodiment, effective FOV 240 is approximately 210 degrees. In particular, a first antenna pair of two of the three antennas 245, 246, 247 (e.g., antenna pair A-B) has a first FOV 242 and a second antenna pair of two of the three antennas 245, 246, 247 (e.g., antenna pair B-C) has a second FOV 244. The first FOV 242 and second FOV 244 collectively result in an effective FOV 240 covering approximately 210 degrees in two sectors.

FIG. 2E illustrates an effective FOV 250 of four FOVs 252-258 of four antenna pairs of four antennas, according to at least one embodiment. The effective FOV 250 is expanded to be greater than 120 degrees of FOV 210 using four antennas 245, 246, 247, 249. In at least one embodiment, effective FOV 250 is approximately 360 degrees. In particular, a first antenna pair of two of the four antennas 245, 246, 247, 249 (e.g., antenna pair A-B) has a first FOV 252, a second antenna pair of two of the four antennas 245, 246, 247, 249 (e.g., antenna pair A-D) has a second FOV 254, a third antenna pair of two of the four antennas 245, 246, 247, 249 (e.g., antenna pair D-C) has a third FOV 256, and a fourth antenna pair of two of the four antennas 245, 246, 247, 249 (e.g., antenna pair C-B) has a fourth FOV 258. The four FOVs 252-258 collectively result in an effective FOV 250 covering approximately 360 degrees in four sectors.

FIG. 2F illustrates an effective FOV 260 of three FOVs 262-266 of three antenna pairs of six antennas, according to at least one embodiment. The effective FOV 260 is expanded to be greater than 120 degrees of FOV 210 using six antennas 268-278. In at least one embodiment, effective FOV 260 is approximately 360 degrees. In particular, a first antenna pair of two of the six antennas 268-278 (e.g., antenna pair 1A-1B) has a first FOV 262, a second antenna pair of two of the six antennas 268-278 (e.g., antenna pair 2A-2B) has a second FOV 264, and a third pair of two of the six antennas 268-278 (e.g., antenna pair 3A-3B) has a third FOV 266. The first FOV 262, second FOV 264, and third FOV 266 collectively result in an effective FOV 260 covering approximately 360 degrees in three sectors.

As described above, UWB module 202, using the RF switching circuitry 208, can switch between different antenna pairs of the N antennas 206 between ranging sessions, ranging blocks, or ranging rounds as set forth in FIGS. 3-9B.

Figure 3:
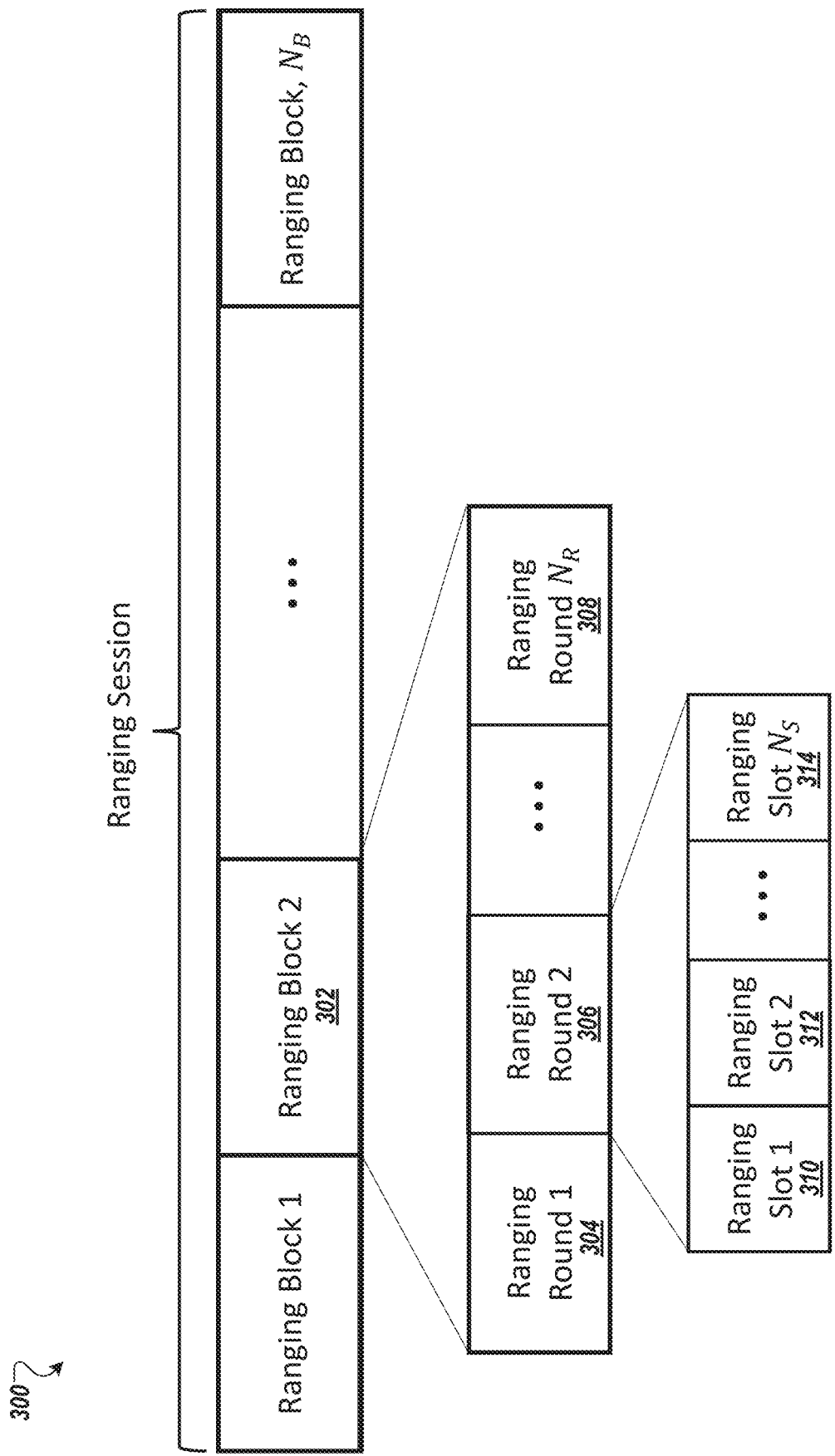
FIG. 3 is a timing diagram for an example ranging session with multiple ranging blocks, ranging rounds, and ranging slots, according to at least one embodiment.

FIG. 3 is a timing diagram for an example ranging session 300 with multiple ranging blocks, ranging rounds, and ranging slots, according to at least one embodiment. The ranging session 300 includes one or more ranging blocks. A ranging block, such as ranging block 302, is a time period for ranging and includes a whole number of ranging rounds, such as ranging rounds 304-308. A ranging round is a period of sufficient duration to complete one entire range-measurement cycle. Each ranging round, such as ranging round 306, is subdivided into an integer number of ranging slots 310-314. A ranging slot is a time period of sufficient duration to transmit at least one ranging frame. The slot duration and the number of slots make up a ranging round.

Figure 4A:
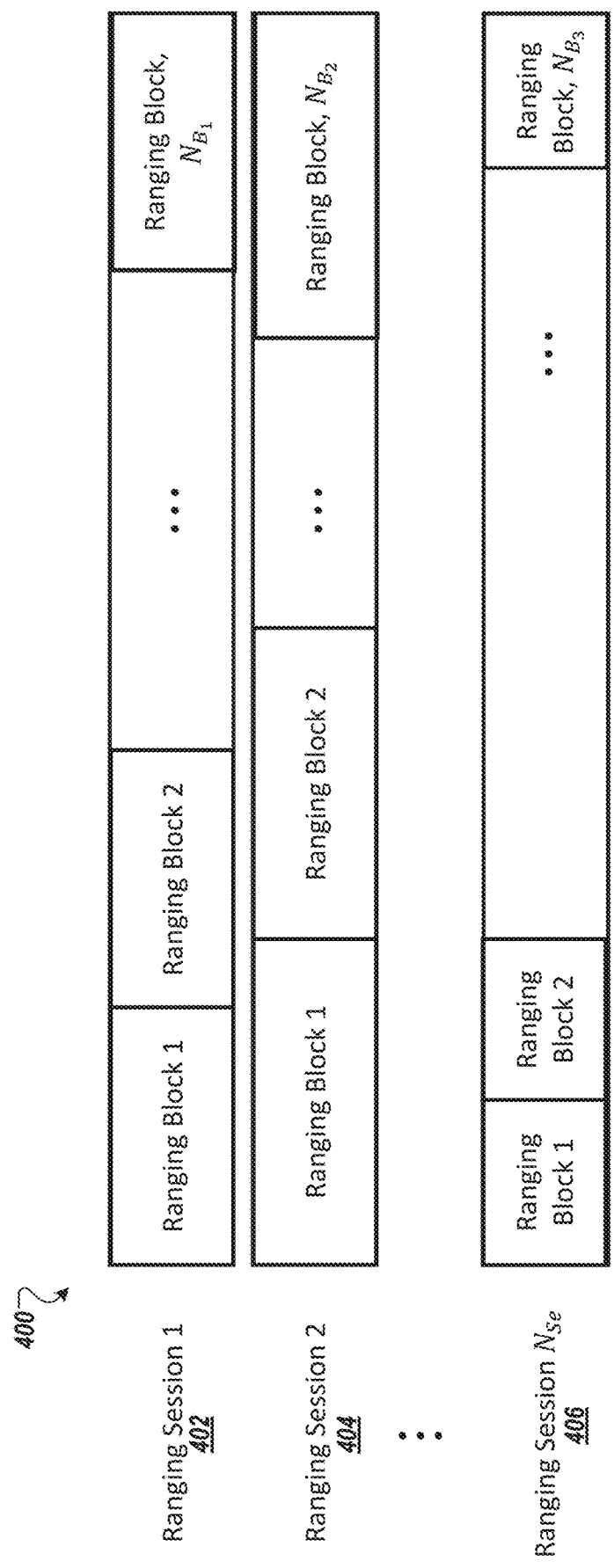
FIG. 4A is a timing diagram for multiple ranging sessions, each with multiple ranging blocks, according to at least one embodiment.

FIG. 4A is a timing diagram 400 for multiple ranging sessions, each with multiple ranging blocks, according to at least one embodiment. The multiple ranging sessions can occur in parallel and are configured to have different times. For example, a first ranging session 402 includes a first number, NB1, ranging blocks having a first duration. A second ranging session 404 includes a second number, NB2, ranging blocks having a second duration. An Nth ranging session 406 includes a number, NB3, ranging blocks having a different duration. The first duration can be less than the second duration, and the different duration of the Nth ranging session 406 can be less than the first duration. Each session can have the same or different numbers of rounds and the same or different durations. Each parallel session can have different ranging block, round, and slot durations. The configuration information can define the attributes of how many sessions, how many rounds, how many slots, duration of sessions, duration of rounds, duration of slots, or the like. The configuration information can also define a schedule for the sessions, rounds, slots, or the like.

Figure 4B:
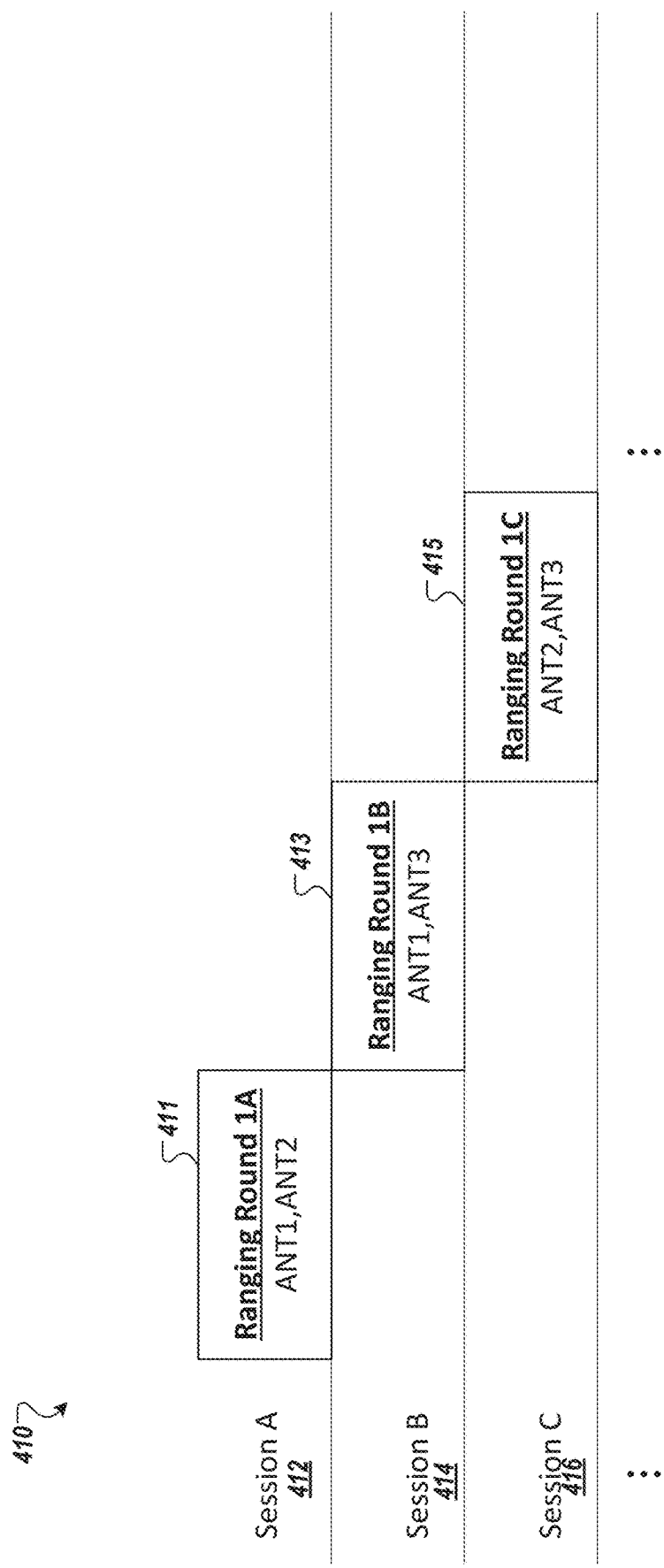
FIG. 4B is a timing diagram of a schedule for obtaining AoA values in ranging rounds of different ranging sessions, according to at least one embodiment.

FIG. 4B is a timing diagram of a schedule 410 for obtaining AoA values in ranging rounds of different ranging sessions, according to at least one embodiment. An AP host (e.g., a next higher layer above UWB module) can generate the schedule 410 in which a first AoA value of a first antenna pair (Ant1, Ant2) is measured during a ranging round 411 of a first ranging session 412, a second AoA value of a second antenna pair (Ant1, Ant3) is measured during a ranging round 413 of a second ranging session 414, and a third AoA value of a third antenna pair (Ant2, Ant3) is measured during a ranging round 415 of a third ranging session 416, and so forth. In this embodiment, an AoA value is obtained in ranging rounds of different sessions. The ranging rounds 411, 413, 415 can be back-to-back (e.g., consecutive rounds) or separated out in time. The AP host can configure and send the antenna selection for each session or during each session configuration.

FIG. 4C is a timing diagram of a schedule 420 for obtaining AoA values in different ranging rounds of a same session, according to at least one embodiment. An AP host (e.g., a next higher layer above UWB module) can generate the schedule 420 in which a first AoA value of a first antenna pair (Ant1, Ant2) is measured during a first ranging round 421, a second AoA value of a second antenna pair (Ant1, Ant3) is measured during a second ranging round 423, and a third AoA value of a third antenna pair (Ant2, Ant3) is measured during a third ranging round 425, all of a same ranging session 422. In this embodiment, an AoA value is obtained in different ranging rounds of a same session. The ranging rounds 421, 423, 425 can be back-to-back as consecutive ranging rounds in a same session or separated out in time in the same session. The AP host can configure and send the antenna selection for each ranging round during session configuration.

Figure 4D:
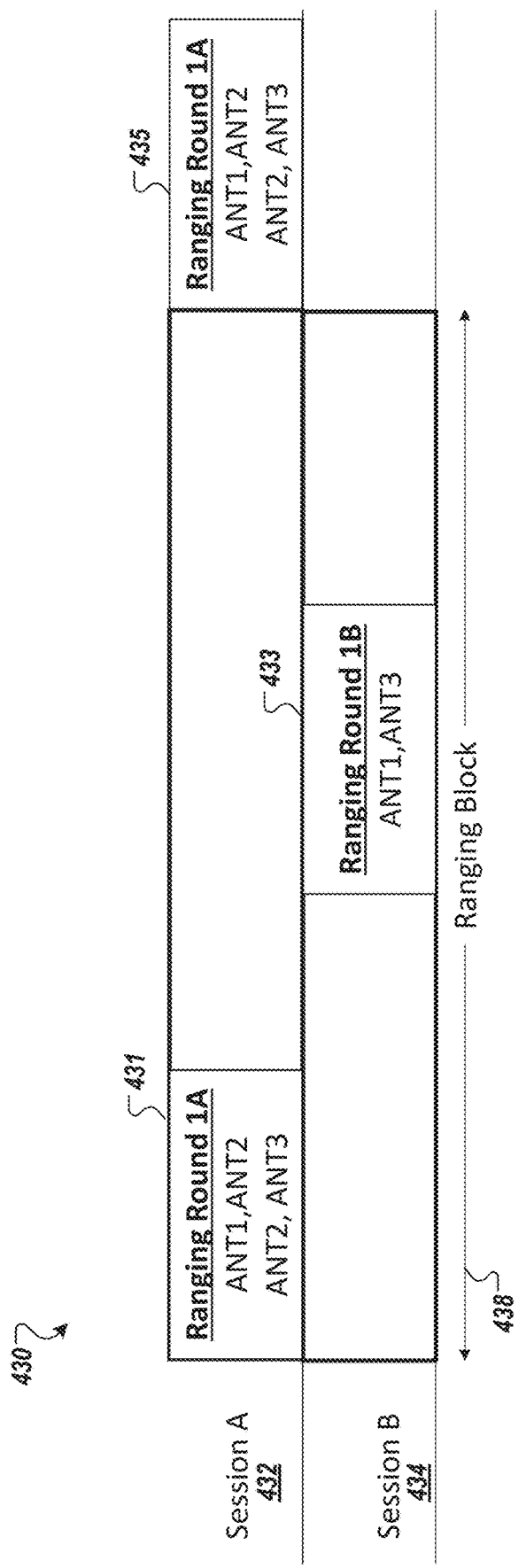
FIG. 4D is a timing diagram of a schedule for obtaining AoA values in different ranging rounds of two ranging sessions within a same ranging block, according to at least one embodiment.

FIG. 4D is a timing diagram of a schedule 430 for obtaining AoA values in different ranging rounds of two ranging sessions within a same ranging block, according to at least one embodiment. An AP host (e.g., a next higher layer above UWB module) can generate the schedule 420 in which a first AoA value of a first antenna pair (Ant1, Ant2) is measured during a ranging round 431 of a first ranging session 432 and a second AoA value of a second antenna pair (Ant1, Ant3) is measured during a ranging round 433 of a second ranging session 434, and a third AoA value of a third antenna pair (Ant2, Ant3) is measured during a ranging round 435 of the first ranging session. In this embodiment, the ranging round 431 and the ranging round 433 are part of a first ranging block 438, and the ranging round 435 is part of a next ranging block. In this embodiment, an AoA value is obtained in consecutive ranging sessions and multiple ranging sessions. The ranging rounds 431 and 433 can be back-to-back or separated out in time. The ranging rounds 433 and 435 can be back-to-back or separated out in time. The AP host can configure and send the antenna selection for each ranging round for each session or during session configuration.

As described above, the AP host can select different antenna pairs using a command or an informational element (IE) of a command, such as illustrated in FIG. 5.

Figure 5A:
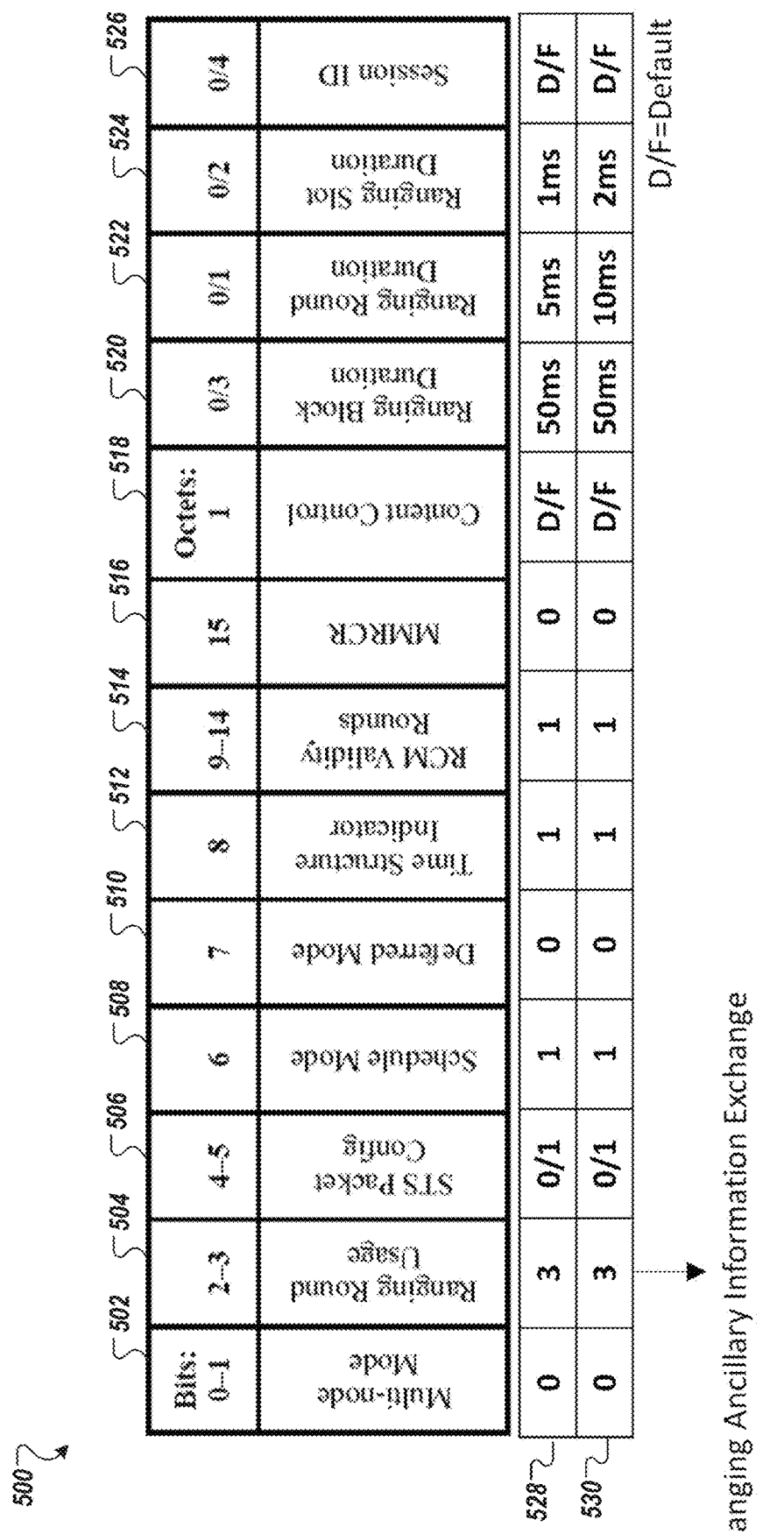
FIG. 5A is an example frame element that includes data transfer information, according to at least one embodiment.

FIG. 5A is an example frame element 500 that includes data transfer information, according to at least one embodiment. In at least one embodiment, the frame element 500 is an Advanced Ranging Control Information Element (ARC IE), and the various fields of the ARC IE are used for configuring ranging parameters for ranging. In the ranging mode, the ARC IE can convey ranging parameters to control and configure aspects of the ranging procedures, such as the time-slot structure, the ranging methods, and the packet configuration. In another embodiment, the frame element 500 includes similar fields as the ARC IE element. In at least one embodiment, the frame element 500 includes various fields, including: a multi-node mode field 502, a round usage field 504, a packet configuration field 506, a schedule mode field 508, a deferred mode field 510, a time structure indicator field 512, an RCM validity rounds field 514, a Multiple Message Receipt Confirmation Request (MMRCR) field 516, a content control field 518, a block duration field 520, a round duration field 522, a slot duration field 524, and a session identifier (ID) field 526.

In at least one embodiment, a value in the multi-node mode field 502 specifies whether ranging is performed between a single pair of devices or is multi-node ranging or data transfer involving many devices. The multi-node mode field 501 can have a first value to specify a single device to a single device (unicast), a second value to specify a multi-node one-to-many (multi-cast or broadcast), or a third value to specify multi-node many-to-many (multicast). A fourth value can be reserved for an additional mode. A value in the round usage field 504 specifies the use of the current round and a subsequent number of round(s) following the RCM as specified in the RCM validity rounds field 514. The Packet configuration field 506 specifies the packet format used in the round(s) that follow the ARC IE. A value in the schedule mode field 508 specifies whether a scheduled-based ranging, a contention-based ranging, or the like, is being performed. A value in the deferred mode field 510 specifies whether or not the deferred frame is allowed for the measurement report in a ranging mode. If the field value is one, it indicates that ranging slots are scheduled for the exchange of deferred data frame(s) after the ranging cycle, which should typically be used to report certain measurement information, for example, TOF, reply time, and AoA. If the field value is zero, it indicates that ranging slots are not scheduled for data frames to exchange requested information, and the requested information should be embedded in a response frame (RFRAME). A value in the time structure indicator field 512 specifies the time structure behavior in the following rounds (e.g., interval-based or block-based). A value in the RCM validity rounds field 514 is an unsigned integer that specifies the number of consecutive rounds controlled by the RCM. It should be noted that this value cannot be larger than the number of remaining rounds in the current block. A value in the MMRCR field 516 indicates whether multiple message receipt confirmation is requested or not: if the MMRCR field value is one, it is requested; otherwise, it is not, for example. A value in the content control field 518 indicates the presence of other fields in the ARC IE, such as the block duration field 520, a round duration field 522, a slot duration field 524, and a session ID field 526. A value in the block duration field 520 is an unsigned integer that specifies the duration of a ranging block in the standard transmission unit. A value in the round duration field 522 is an unsigned integer that specifies the duration of the round in units of slots, which is the number of slots in the round. A value in the slot duration field 524 is an unsigned integer that specifies the duration of a slot in a standard transmission unit. A ranging session can be configured, and a value in the session ID field 526 contains a session identifier (e.g., a 4-octet session ID) unique to a ranging session assigned by the controller. In at least one embodiment, if there is no change to the timing information, one or more fields (e.g., 520-524) can be omitted from the frame element 500 until there is a change. The various fields of frame element 500 include example values corresponding to the different ranging rounds.

Figure 5B:
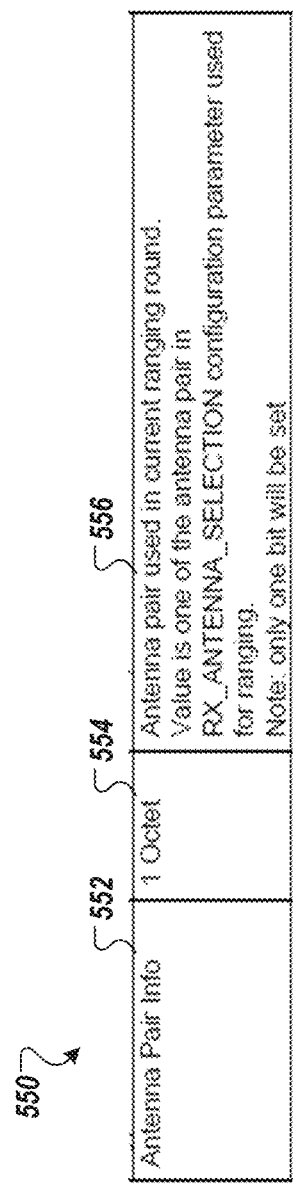
FIG. 5B is a table illustrating antenna pair information according to at least one embodiment.

FIG. 5B is a table 550 illustrating antenna pair information according to at least one embodiment. Table 550 specifies that the antenna pair information 552 can be stored in one octet 554 in a command and can specify a value 556 representing one of the antenna pairs as specified in configuration parameters used for ranging, called RX_ANTENNA_SELECTION.

Figure 6A:
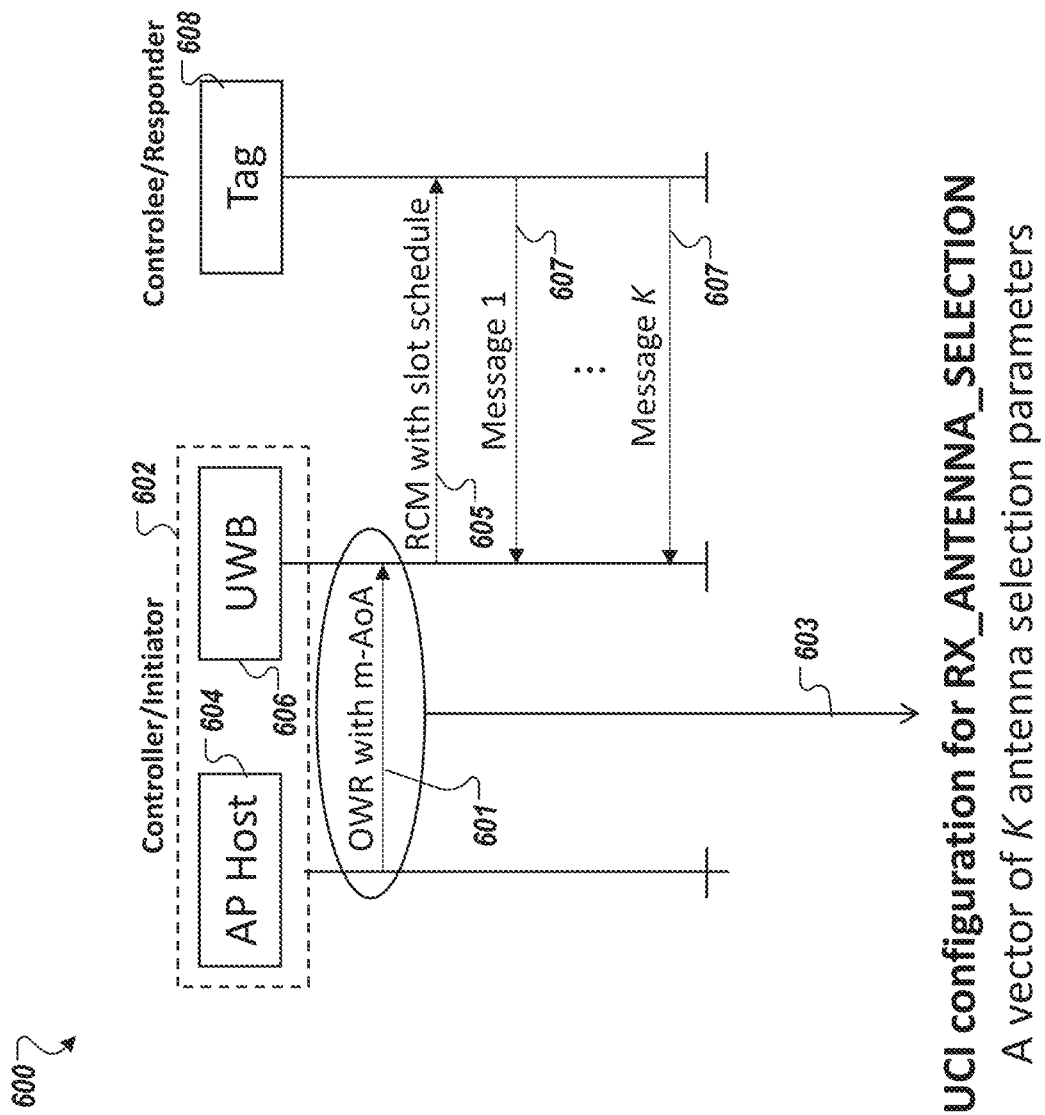
FIG. 6A is a sequence diagram illustrating one-way ranging (OWR) for multiple AoA measurements in a ranging round, according to at least one embodiment.

FIG. 6A is a sequence diagram 600 illustrating OWR for multiple AoA measurements in a ranging round, according to at least one embodiment. An initiator 602 (also referred to as a controller) includes an AP host 604 and a UWB module 606 with a UCI between the AP host 604 and the UWB module 606. The initiator 602 can be a UWB anchor device as described herein. The initiator 602 sends and receives messages with a responder 608 (also referred to as controlee). The responder 608 can be a UWB tag device as described herein. In this embodiment, the AP host 604 sends a command 601 for OWR for multiple AoA measurements in a ranging round. The command 601 can be a UCI command with UCI configuration. The command 601 can specify the UCI configuration for the configuration parameters 603 used for ranging, called RX_ANTENNA_SELECTION. The configuration parameter can be a vector of K antenna selection parameters. The initiator 602, in response to command 601, sends a first ranging message 605 with scheduling information to the responder 608. The first ranging message 605 can be a ranging control message (RCM) with a slot schedule. The first ranging message 605 includes data that causes the responder 608 to send a signal multiple times corresponding to multiple slots of the slot schedule. The responder 608 sends a message 607 back to the initiator 602 multiple times. Because responder 608 sends the message 607 multiple times, the initiator 602 can switch between different pairs of antennas to measure multiple AoA values during a ranging round. It should be noted that the UWB module 606 can send one or more control signals to the RF switching circuitry to switch between antenna pairs based on the slot schedule.

Figure 6B:
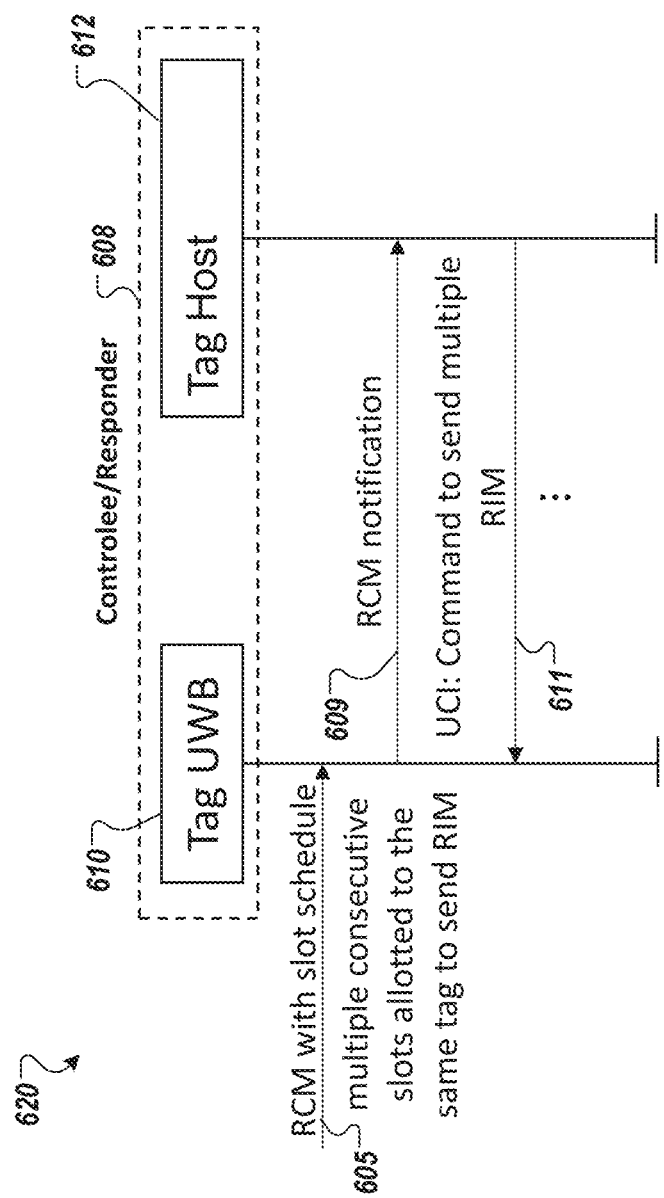
FIG. 6B is a sequence diagram illustrating a UWB command interface (UCI) command on a tag device for OWR for multiple AoA measurements in a ranging round, according to at least one embodiment.

FIG. 6B is a sequence diagram 620 illustrating a UCI command on a tag device for OWR for multiple AoA measurements in a ranging round, according to at least one embodiment. Responder 608 includes a UWB tag module 610 and a tag host 612 (e.g., a higher layer such as an application layer on top of the UWB layer). The UWB tag module 610 can use a UCI between the UWB tag module 610 and the tag host 612. In response to receiving the first ranging message 605 (RCM with slot schedule), UWB tag module 610 sends a notification 609 (RCM notification) to the tag host 612. The tag host 612, in response, sends a UCI command 611 to the UWB tag module 610 to send the message 607 multiple times based on the slot schedule. In at least one embodiment, the UCI command 611 causes the UWB tag module 610 to send multiple ranging messages, such as multiple ranging initiation messages (RIMs) to the initiator 602.

Figure 6C:
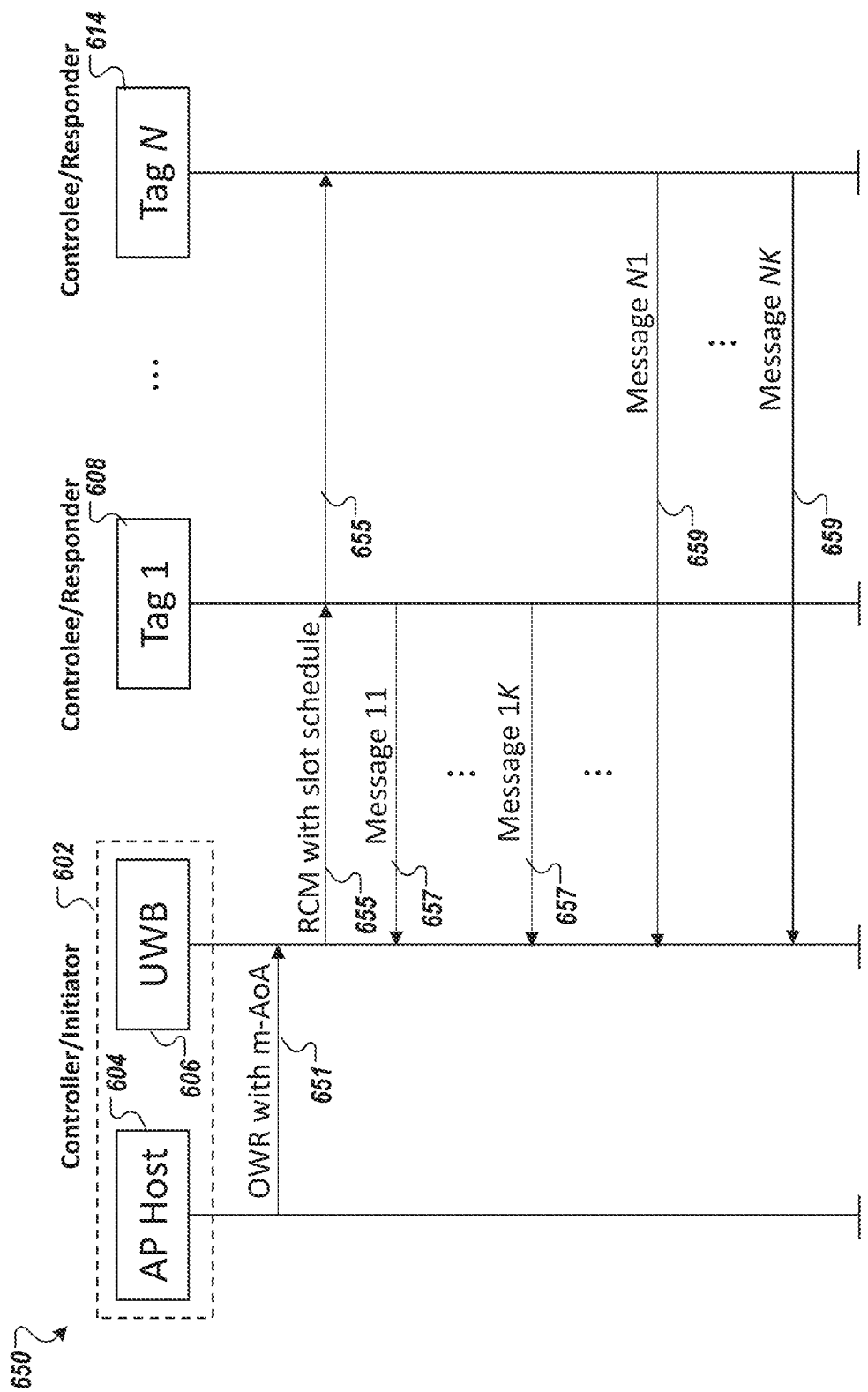
FIG. 6C is a sequence diagram illustrating multi-mode OWR for multiple AoA measurements in a ranging round, according to at least one embodiment.

FIG. 6C is a sequence diagram 650 illustrating multi-mode OWR for multiple AoA measurements in a ranging round, according to at least one embodiment. The initiator 602 includes the AP host 604 and the UWB module 606 and sends and receives messages with the responder 608 (also referred to as controlee). In this embodiment, the initiator 602 also sends and receives messages with one or more additional responders 614. The responder 608 and additional responders 614 can be UWB tag devices. In this embodiment, the AP host 604 sends a command 651 for multi-mode OWR for multiple AoA measurements in a ranging round. The command 651 can be a UCI command with UCI configuration. The command 651 can specify the UCI configuration for the configuration parameters used for ranging, called RX_ANTENNA_SELECTION. The configuration parameter can be a vector of K antenna selection parameters. The initiator 602, in response to command 651, sends a first ranging message 655 with scheduling information to the responder 608 and the additional responders 614. The first ranging message 655 can be an RCM with a slot schedule. The first ranging message 655 includes first data that causes the responder 608 to send a signal at multiple times corresponding to multiple slots of the slot schedule and second data that causes the additional responders 614 to send a signal at multiple times corresponding to multiple slots of the slot schedule. The responder 608 sends a message 657 back to the initiator 602 multiple times, corresponding to a first set of slots in the ranging round. The additional responders 614 send a message 659 back to the initiator 602 multiple times, corresponding to a second set of slots in the ranging round. Because the responder 608 and additional responders 614 send the messages multiple times, the initiator 602 can switch between different antenna pairs to measure multiple AoA values during a ranging round. It should be noted that the UWB module 606 can send one or more control signals to the RF switching circuitry to switch between antenna pairs based on the slot schedule. It should also be noted that the multi-node OWR mode with multiple AoAs can be accomplished with minimal changes or no changes to a MAC specification of the UWB standards. It should also be noted that these changes would be transparent to the UWB tag device.

Figure 7A:
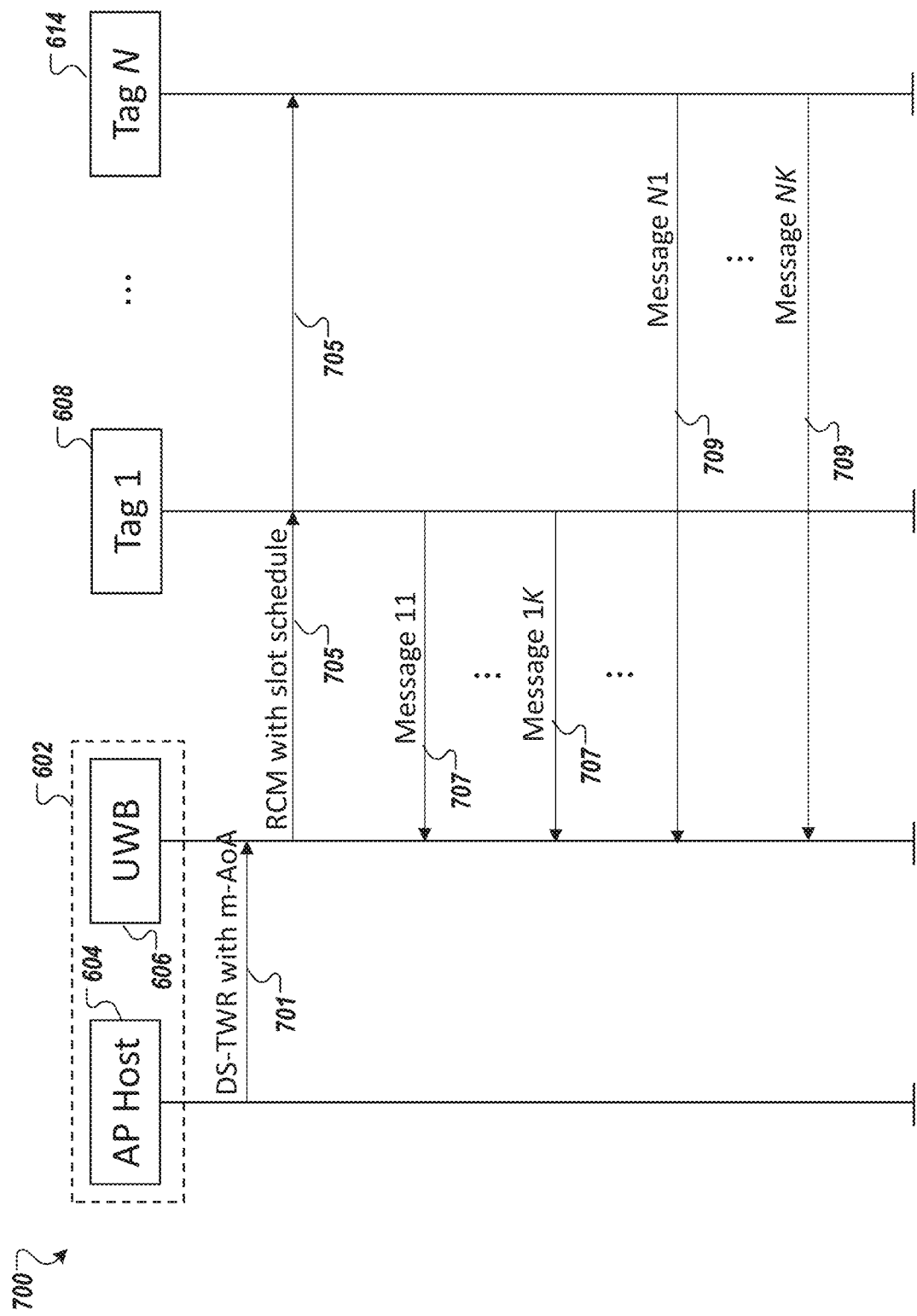
FIG. 7A is a sequence diagram illustrating multi-mode double-sided two-way ranging (DS-TWR) for multiple AoA measurements in a ranging round, according to at least one embodiment.

FIG. 7A is a sequence diagram 700 illustrating multi-mode double-sided two-way ranging (DS-TWR) for multiple AoA measurements in a ranging round, according to at least one embodiment. The initiator 602 includes the AP host 604 and the UWB module 606 and sends and receives messages with the responder 608 (also referred to as controlee). In this embodiment, the initiator 602 also sends and receives messages with one or more additional responders 614. The responder 608 and additional responders 614 can be UWB tag devices. In this embodiment, the AP host 604 sends a command 701 for multi-mode DS-TWR for multiple AoA measurements in a ranging round. The command 701 can be a UCI command with UCI configuration. The command 701 can specify the UCI configuration for the configuration parameters used for ranging, called RX_ANTENNA_SELECTION. The configuration parameter can be a vector of K antenna selection parameters. The initiator 602, in response to command 701, sends a first ranging message 705 with scheduling information to the responder 608 and the additional responders 614. The first ranging message 705 can be an RCM with a slot schedule. The first ranging message 705 includes first data that causes the responder 608 to send a signal at multiple times corresponding to multiple slots of the slot schedule and second data that causes the additional responders 614 to send a signal at multiple times corresponding to multiple slots of the slot schedule. The responder 608 sends a message 707 back to the initiator 602 multiple times, corresponding to a first set of slots in the ranging round. The additional responders 614 send a message 709 back to the initiator 602 multiple times, corresponding to a second set of slots in the ranging round. Because the responder 608 and additional responders 614 send the messages multiple times, the initiator 602 can switch between different antenna pairs to measure multiple AoA values during a ranging round. It should be noted that the UWB module 606 can send one or more control signals to the RF switching circuitry to switch between antenna pairs based on the slot schedule. It should also be noted that the multi-node DS-TWR mode with multiple AoAs can be accomplished with minimal changes or no changes to a MAC specification of the UWB standards. It should also be noted that these changes would be transparent to the UWB tag device.

Figure 7B:
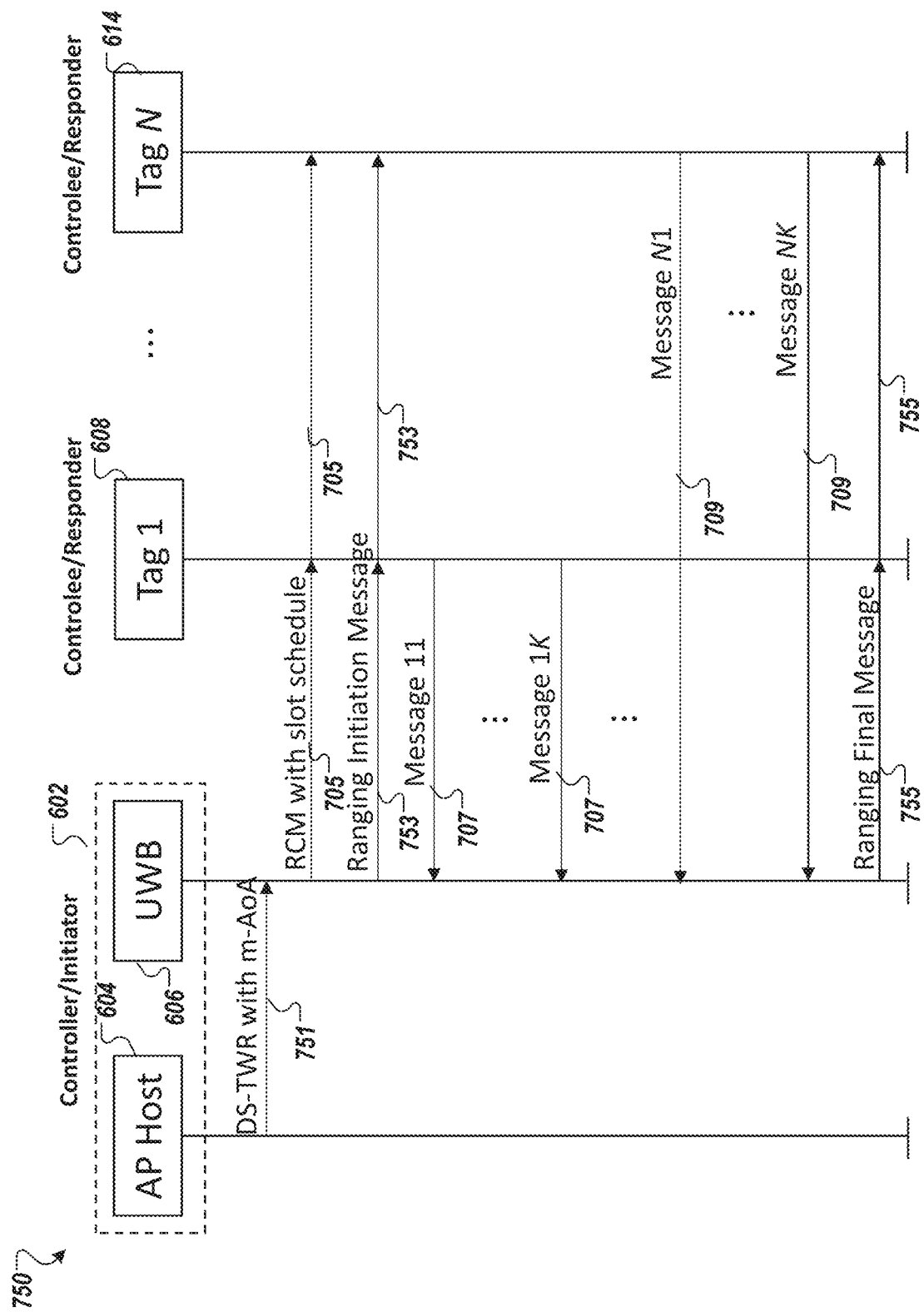
FIG. 7B is a sequence diagram illustrating multi-mode DS-TWR for multiple AoA measurements in a ranging round, according to at least one embodiment.

FIG. 7B is a sequence diagram 750 illustrating multi-mode DS-TWR for multiple AoA measurements in a ranging round, according to at least one embodiment. The sequence diagram 750 is similar to sequence diagram 700 except as noted below.

In this embodiment, the AP host 604 sends a command 751 for multi-mode DS-TWR for multiple AoA measurements in a ranging round. The initiator 602, in response to command 751, sends a first ranging message 705 with scheduling information to the responder 608 and the additional responders 614 and a second ranging message 753. The first ranging message 705 can be an RCM with a slot schedule, and the second ranging message 753 can be a RIM. The first ranging message 705 and/or the second ranging message 753 includes first data that causes the responder 608 to send a signal at multiple times corresponding to multiple slots of the slot schedule and second data that causes the additional responders 614 to send a signal at multiple times corresponding to multiple slots of the slot schedule. For example, the responder 608, in response to the second ranging message 753, sends the message 707 back to the initiator 602 multiple times, corresponding to a first set of slots in the ranging round. The additional responders 614, in response to the second ranging message 753, send the message 709 back to the initiator 602 multiple times, corresponding to a second set of slots in the ranging round. Because the responder 608 and additional responders 614 send the messages multiple times, the initiator 602 can switch between different antenna pairs to measure multiple AoA values during a ranging round. It should be noted that the UWB module 606 can send one or more control signals to the RF switching circuitry to switch between antenna pairs based on the slot schedule. It should be noted that the multi-node DS-TWR mode with multiple AoAs can be accomplished with minimal changes or no changes to a MAC specification of the UWB standards. It should also be noted that these changes would be transparent to the UWB tag device.

Figure 8A:
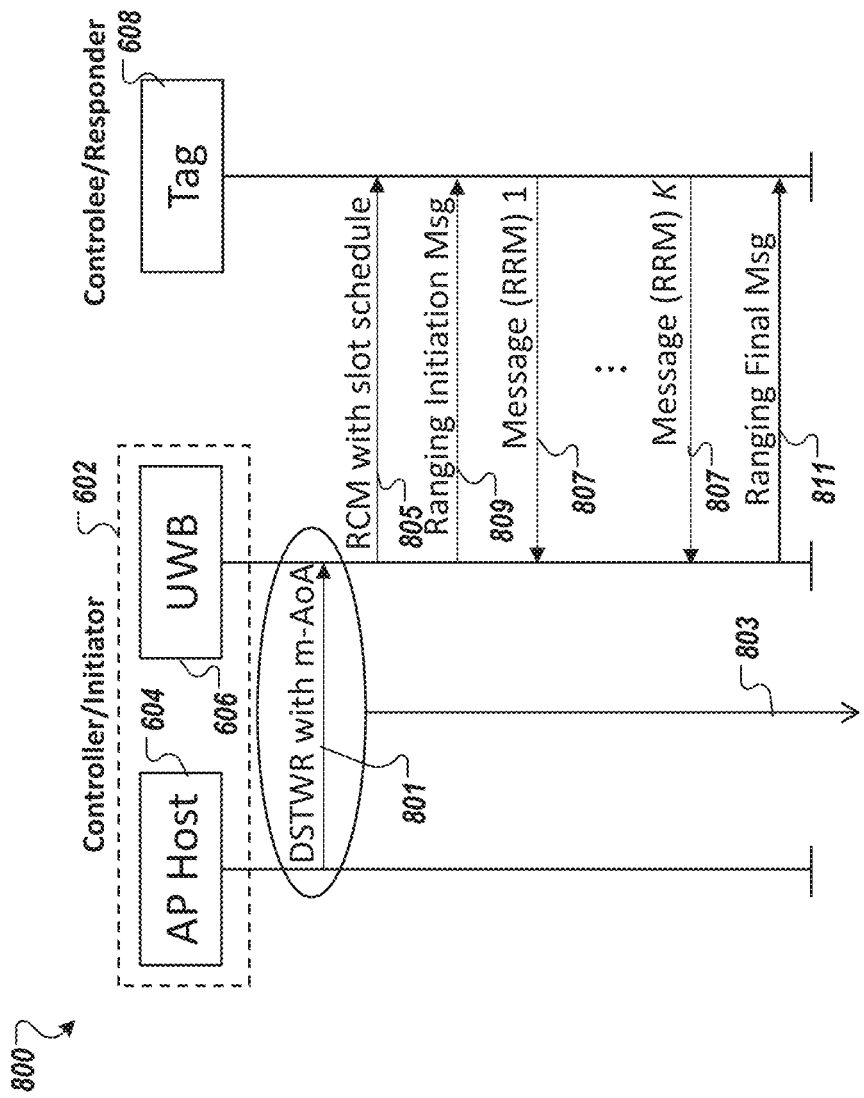
FIG. 8A is a sequence diagram illustrating single-node DS-TWR for multiple AoA measurements in a ranging round, according to at least one embodiment.

FIG. 8A is a sequence diagram 800 illustrating single-node DS-TWR for multiple AoA measurements in a ranging round, according to at least one embodiment. The initiator 602 includes the AP host 604 and the UWB module 606 and sends and receives messages with the responder 608 (also referred to as controlee). In this embodiment, the AP host 604 sends a command 801 for single-node DS-TWR for multiple AoA measurements in a ranging round. The command 801 can be a UCI command with UCI configuration. The command 801 can specify the UCI configuration for the configuration parameters used for ranging, called RX_ANTENNA_SELECTION. The configuration parameter can be a vector of K antenna selection parameters. The initiator 602, in response to command 801, sends a first ranging message 805 with scheduling information to the responder 608 and a second ranging message 809. The first ranging message 705 can be an RCM with a slot schedule, and the second ranging message 809 can be a RIM. The first ranging message 805 and/or second ranging message 809 includes data that causes the responder 608 to send a signal multiple times corresponding to multiple slots of the slot schedule. The responder 608 sends a message 807 back to the initiator 602 multiple times, corresponding to multiple slots in the ranging round. Because responder 608 sends the messages multiple times, the initiator 602 can switch between different antenna pairs to measure multiple AoA values during a ranging round. It should be noted that the UWB module 606 can send one or more control signals to the RF switching circuitry to switch between antenna pairs based on the slot schedule. It should also be noted that the single-node DS-TWR with multiple AoAs can be accomplished with minimal changes or no changes to a MAC specification of the UWB standards. It should also be noted that these changes would be transparent to the UWB tag device.

Figure 8B:
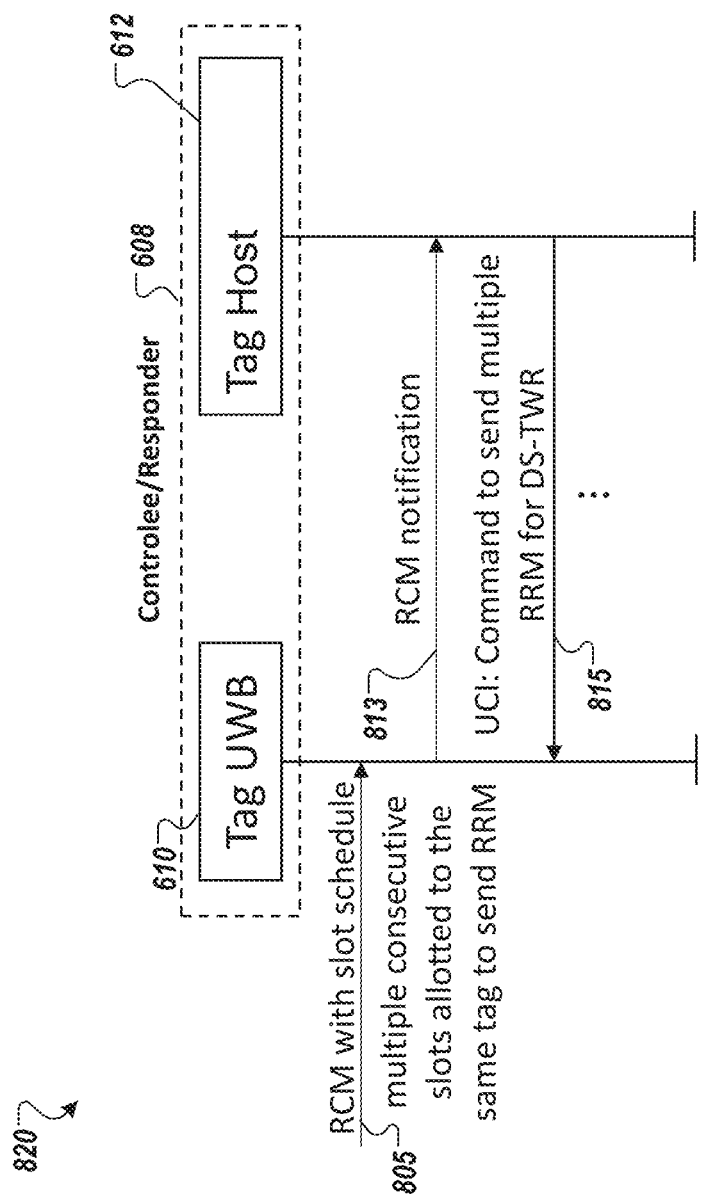
FIG. 8B is a sequence diagram illustrating UCI on a tag device for single-node or multi-mode DS-TWR for multiple AoA measurements in a ranging round, according to at least one embodiment.

FIG. 8B is a sequence diagram 820 illustrating UCI on a tag device for single-node or multi-mode DS-TWR for multiple AoA measurements in a ranging round, according to at least one embodiment. Responder 608 includes UWB tag module 610 and tag host 612. The UWB tag module 610 can use a UCI between the UWB tag module 610 and the tag host 612. In response to receiving the first ranging message 805 (RCM with slot schedule), UWB tag module 610 sends a notification 813 (RCM notification) to the tag host 612. The tag host 612, in response, sends a UCI command 815 to the UWB tag module 610 to send the message 807 multiple times based on the slot schedule. In at least one embodiment, the UCI command 611 causes the UWB tag module 610 to send multiple ranging response messages (RRMs), such as multiple ranging initiation messages (RIMs) to the initiator 602. Multiple consecutive slots can be allotted to the same tag to send RRMs.

Figure 9A:
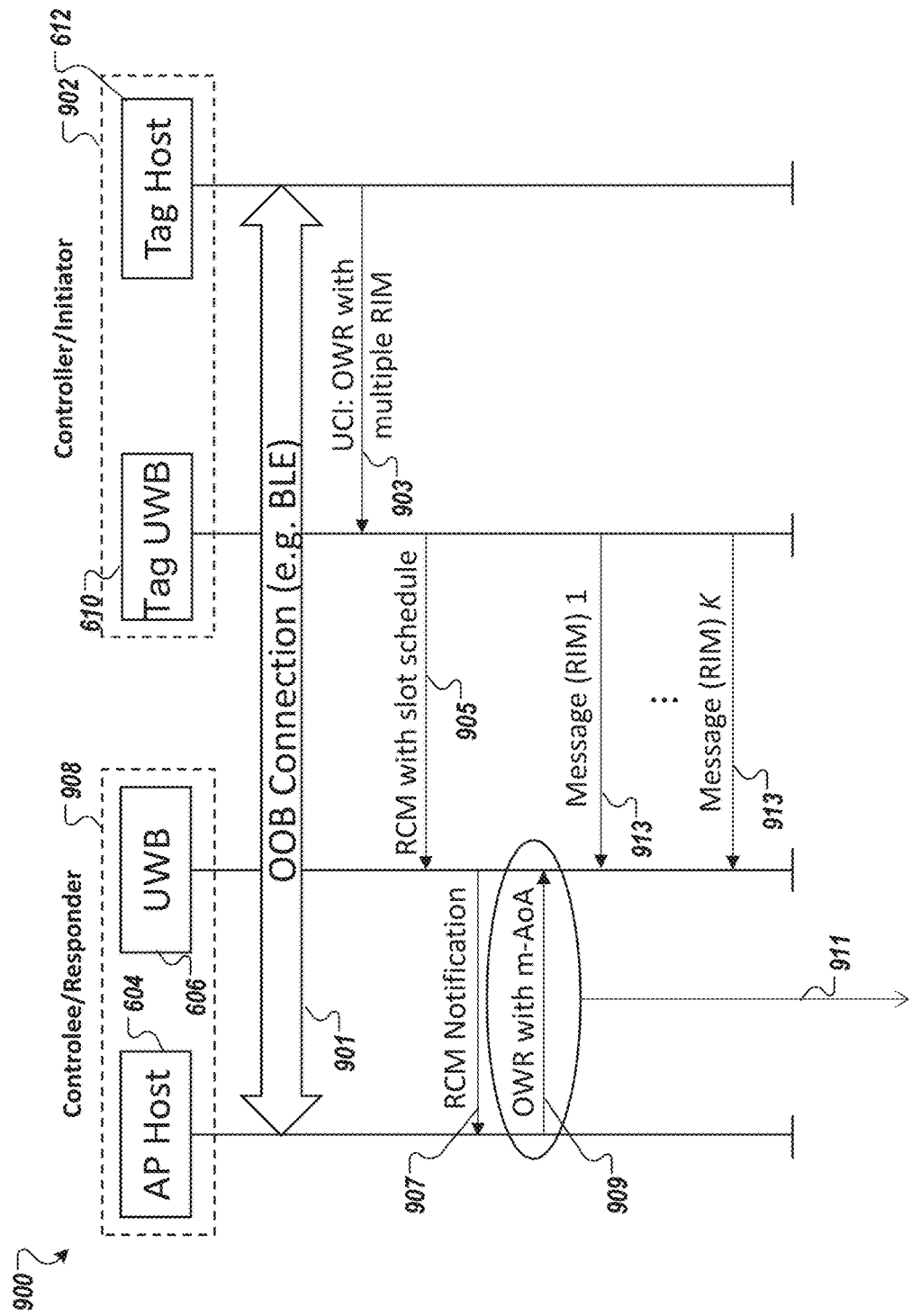
FIG. 9A is a sequence diagram illustrating OWR for multiple AoA measurements in a ranging round with an out-of-band (OOB) connection, according to at least one embodiment.

FIG. 9A is a sequence diagram 900 illustrating OWR for multiple AoA measurements in a ranging round with an out-of-band (OOB) connection, according to at least one embodiment. In this embodiment, an initiator 902 is the UWB tag device, including UWB tag module 610 and tag host 612, and a responder 908 is the UWB anchor device, including AP host 604 and UWB module 606. The initiator 902 can use OWR to send multiple ranging messages to responder 908. In this embodiment, the multiple AoA are determined on the responder 908, instead of the initiator 602 as described above.

In this embodiment, the AP host 604 and the tag host 612 can exchange information regarding OWR for multiple AoA measurements in a ranging round over an OOB connection 901. After exchanging information over the OOB connection 901, the tag host 612 sends a command 903 for OWR for multiple AoA measurements in a ranging round to the UWB tag module 610. The command 903 can be a UCI command with UCI configuration information. The UWB tag module 610, in response to the command 903, sends a first ranging message 905 with scheduling information to the responder 908. The first ranging message 905 can be an RCM with a slot schedule. The first ranging message 605 includes data that specifies that the initiator 902 is to send a signal multiple times corresponding to multiple slots of the slot schedule. In response to the first ranging message 605, the UWB module 606 sends a notification 907 (e.g., RCM notification) to the AP host 604. The AP host 604 sends a command 909 for OWR for multiple AoA measurements in a ranging round to the UWB module 606. The command 909 can be a UCI command with UCI configuration. The command 909 can specify the UCI configuration for the configuration parameters 911 used for ranging, called RX_ANTENNA_SELECTION. The configuration parameter can be a vector of K antenna selection parameters. According to the schedule information, the initiator 902 sends a message 913 back to the responder 908 multiple times, corresponding to multiple slots of the slot schedule. Because the initiator 902 sends the message 913 multiple times, responder 908 can switch between different pairs of antennas to measure multiple AoA values during a ranging round. It should be noted that the UWB module 606 can send one or more control signals to the RF switching circuitry to switch between antenna pairs based on the slot schedule. The RCM can configure the ranging round with K slots, and each slot is scheduled for the same tag device (controller/initiator). The same tag device can send successive ranging initiation messages (RIMs) or polls).

Presently, an M2M round has multiple nodes as initiators. This can be changed so that the same node can send multiple RIMs and a single ranging final message. In another embodiment, the OOB connection 901 can be used for an M2M DS-TWR, as illustrated in FIG. 9B.

Figure 9B:
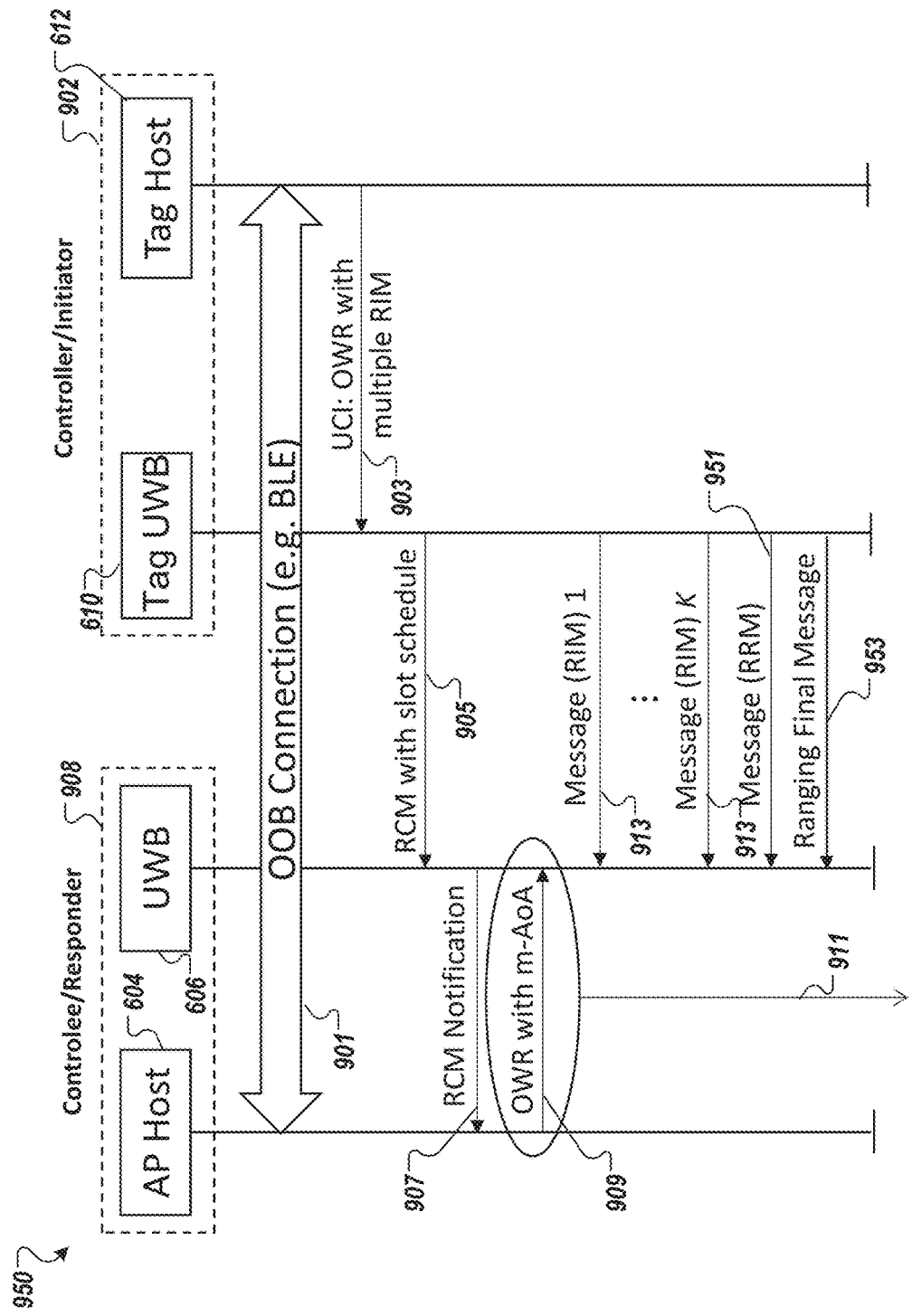
FIG. 9B is a sequence diagram illustrating many-to-many (M2M) DS-TWR for multiple AoA measurements in a ranging round with an OOB connection, according to at least one embodiment.

FIG. 9B is a sequence diagram 950 illustrating many-to-many (M2M) DS-TWR for multiple AoA measurements in a ranging round with an OOB connection, according to at least one embodiment. The sequence diagram 950 is similar to sequence diagram 900 except as noted below. In the M2M DS-TWR, initiator 902 can send multiple RIMs (e.g., 913). The initiator 902 can also send a ranging response message (RRM) 951 and a Final message 953 to the responder 908.

Figure 10A:
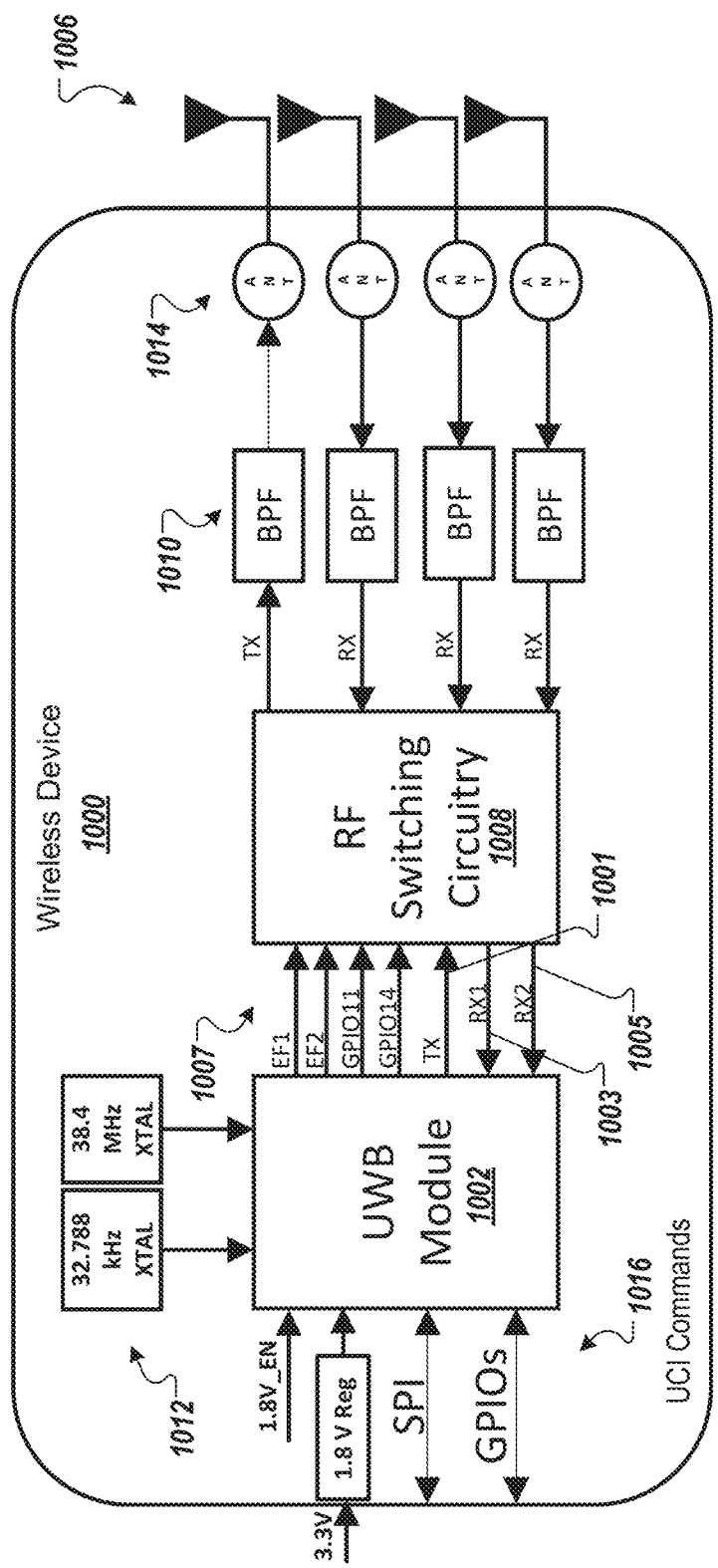
FIG. 10A is a block diagram of a wireless device with four antennas and RF switching circuitry for selecting multiple antenna pairs, according to one embodiment.

FIG. 10A is a block diagram of a wireless device 1000 with four antennas 1006 and RF switching circuitry 1008 for selecting multiple antenna pairs, according to one embodiment. The wireless device 1000 includes UWB module 1002, RF switching circuitry 1008, multiple bandpass filters 1010, clock sources 1012, and multiple antenna ports 1014. Each of the antenna ports 1014 is coupled to one of the multiple antenna 1006 and one of the multiple bandpass filters 1010. The RF switching circuitry 1008 is coupled to the antennas 1006 by way of the bandpass filters 1010 and antenna ports 1014. The RF switching circuitry 1008 is controlled by control signals 1007 from the UWB module 1002. The UWB module 1002 includes a transmit port coupled to the RF switching circuitry 1008 and sends a TX signal 1001 to the RF switching circuitry 1008 when transmitting data to another device. The UWB module 1002 includes two receive ports coupled to the RF switching circuitry 1008 and receives RX signals 1003, 1005 from the RF switching circuitry 1008 when receiving data from another device. The UWB module 1002 can control which of the four antennas 1006 is coupled to the receive ports by controlling the RF switching circuitry 1008 using the control signals 1007 (e.g., EF1, EF2, GPIO11, GPIO14). The UWB module 1002 can control the RF switching circuitry 1008 based on information in one or more commands received from a host over an interface 1016, such as a serial peripheral interface (SPI), a general-purpose input-output (GPIO) terminals, or the like. In at least one embodiment, the host sends UCI commands over the interface 1016 to the UWB module 1002 to select specific antenna pairs at specified times (e.g., a specific set of one or more slots, specific ranging rounds, specific ranging sessions, specific ranging blocks, or the like, as described herein.

Figure 10B:
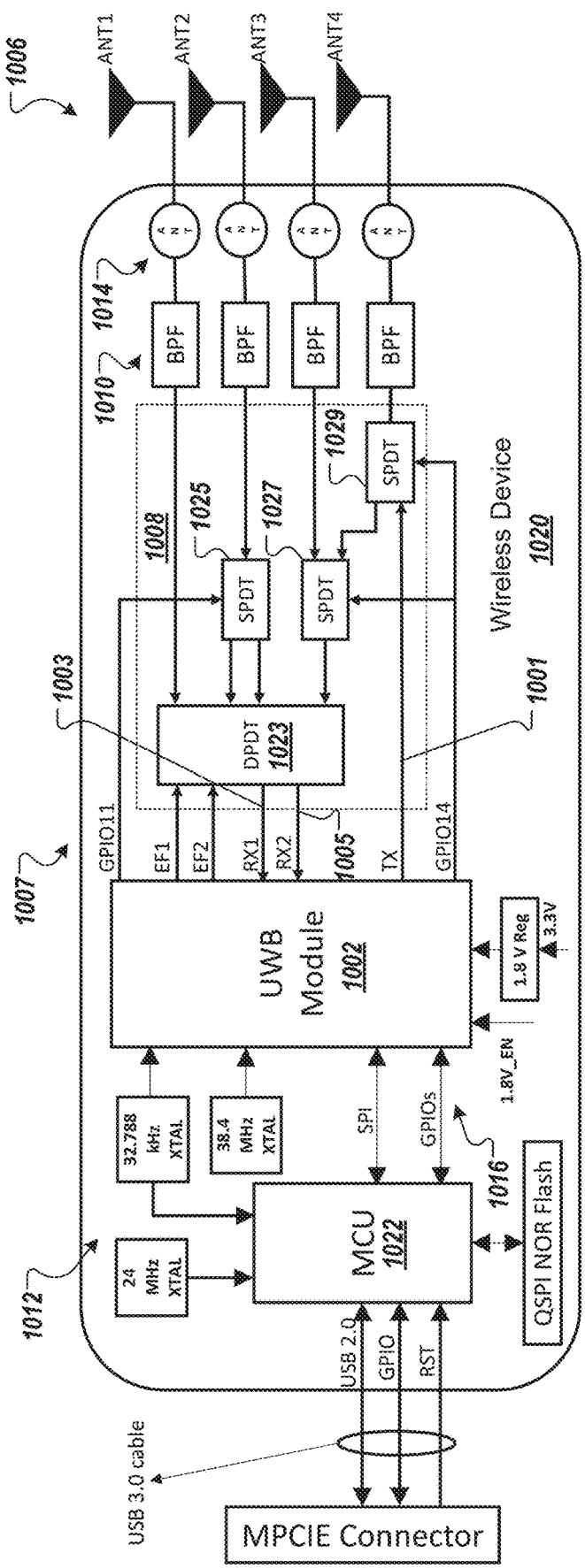
FIG. 10B is a block diagram of a wireless device with four antennas, a double-pole, double-throw (DPDT) switch, and multiple single-pole, double-throw (SPDT) switches for selecting multiple antenna pairs, according to one embodiment.

FIG. 10B is a block diagram of a wireless device 1020 with four antennas, a double-pole, double-throw (DPDT) switch, and multiple single-pole, double-throw (SPDT) switches for selecting multiple antenna pairs, according to one embodiment. The wireless device 1020 is similar to wireless device 1000 as noted with similar reference numbers, except the wireless device 1020 includes specific switches in a specific switch configuration as one example of the RF switching circuitry 1008, and a microcontroller (MCU) coupled to the UWB to provide the UCI commands over the interface 1016. In at least one embodiment, the MCU 1022 is coupled to memory, such as non-volatile memory. The MCU 1022 can execute a host application that sends the UCI commands to the UWB module 1002 over interface 1016. In another embodiment, the MCU 1022 can receive UCI commands from another device coupled to the wireless device 1020, and the MCU 1022 provides the UCI command to the UWB module 1002.

As illustrated, the switch configuration of the RF switching circuitry 1008 of FIG. 10B includes a DPDT switch 1023 coupled to the receive ports of the UWB module 1002 on one side and four data paths to the four antennas 1006 on the other side. The DPDT switch 1023 is controlled by two of the control signals 1007 (e.g., EF1, EF2). The DPDT switch 1023 includes one port coupled to one of the bandpass filters 1010, one of the antenna ports 1014, and a first of the four antennas 1006. The DPDT switch 1023 includes two ports coupled to the SPDT switch 1025. The SPDT switch 1025 is coupled to one of the bandpass filters 1010, one of the antenna ports 1014, and a second of the four antennas 1006. The SPDT switch 1025 can be controlled by one of the control signals 1007 (e.g., GPIO11). The DPDT switch 1023 includes another coupled to the SPDT switch 1027. The SPDT switch 1027 is coupled to one of the bandpass filters 1010, one of the antenna ports 1014, and a third of the four antennas 1006. The SPDT switch 1027 can be controlled by one of the control signals 1007 (e.g., GPIO14). The SPDT switch 1027 is coupled to SPDT switch 1029, which is coupled to the transmit port of the UWB module 1002 and one of the bandpass filters 1010, one of the antenna ports 1014, and a fourth of the four antennas 1006. The SPDT switch 1029 can be controlled by one of the control signals 1007 (e.g., GPIO14). The switching configuration allows the UWB module 1002 to select any two of the four antennas 1006 to receive RX signals on the receiver ports of the UWB module 1002. The RX signals can be used to measure an AoA value for the respective antenna pair. This allows the UWB module 1002 to measure multiple AoA values on a ranging session basis, a ranging block basis, a ranging round basis, etc., as described herein.

Figure 10C:
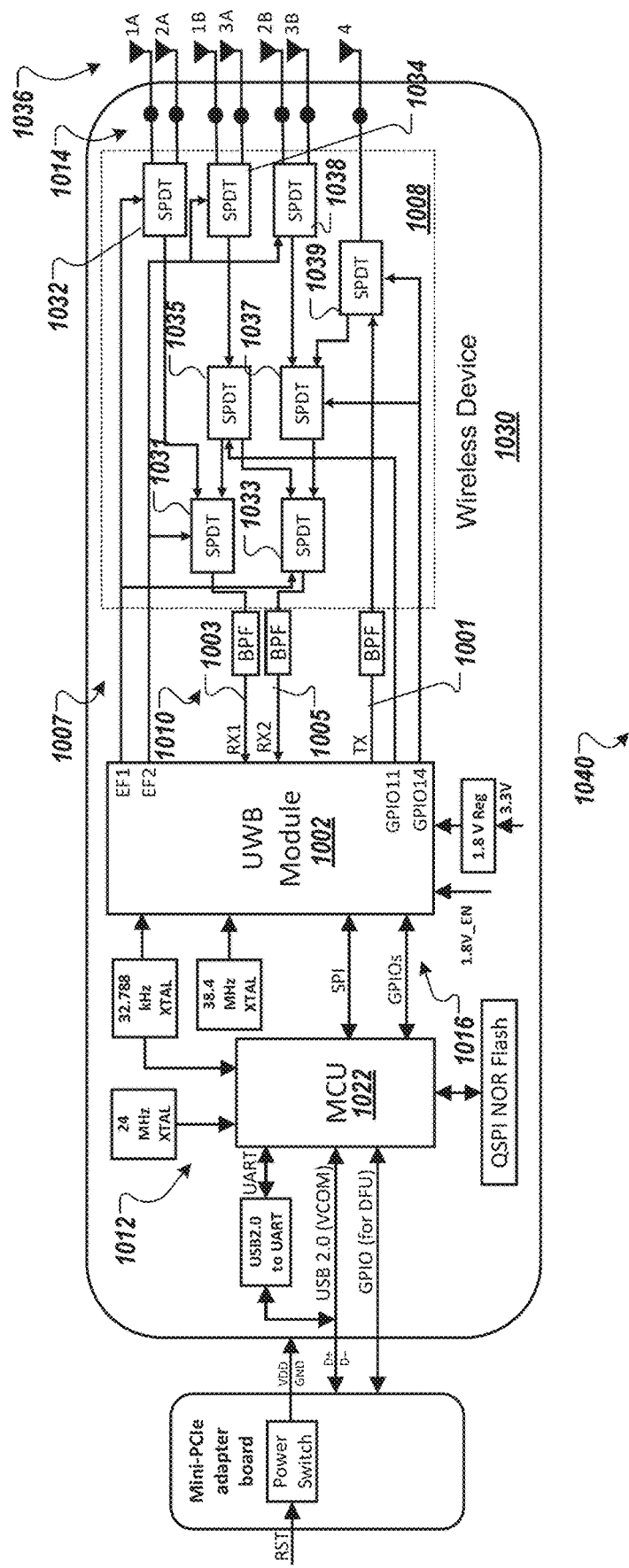
FIG. 10C is a block diagram of a wireless device with seven antennas and multiple SPDT switches and a truth table for selecting multiple antenna pairs, according to one embodiment.

FIG. 10C is a block diagram of a wireless device 1030 with seven antennas 1036 and multiple SPDT switches and a truth table 1040 for selecting multiple antenna pairs, according to one embodiment. The wireless device 1030 is similar to wireless device 1020, as noted with similar reference numbers, except the wireless device 1030 includes specific switches in another switch configuration as another example of the RF switching circuitry 1008.

As illustrated, the switch configuration of the RF switching circuitry 1008 of FIG. 10C includes three SPDT switches 1032, 1034, 1038, each coupled to a pair of antennas 1036 (1A-2A, 1B-3B, 2B-3B). A first SPDT switch 1032 is coupled to a fourth SPDT switch 1031, which is also coupled to a sixth SPDT switch 1035, which is coupled to a second SPDT switch 1034 and fifth SPDT switch 1033. The first SPDT switch 1032 and the fifth SPDT switch 1033 are controlled by one of the control signals 1007 (e.g., EF1). The second SPDT switch 1034, a third SPDT switch 1038, and a fourth SPDT switch 1031 are controlled by one of the control signals 1007 (e.g., EF2). The third SPDT switch 1038 is coupled to a seventh SPDT switch 1037, which is coupled to a fifth SPDT switch 1033 and controlled by one of the control signals 1007 (e.g., GPIO14). The seventh SPDT switch 1037 is coupled to an eighth SPDT switch 1039, which is coupled to a seventh of the seven antennas 1036 and a transmit port of the UWB module 1002. The eighth SPDT switch 1039 is controlled by one of the control signals 1007 (e.g., GPIO14). The RX and TX paths can include one of the bandpass filters 1010.

The truth table 1040 includes the values of the control signals 1007 used to select different antenna pairs, such as 1A-1B, 2A-2B, 3A-3B, or select the seventh antennas for receive or transmit (RX4 or TX4).

Figure 10D:
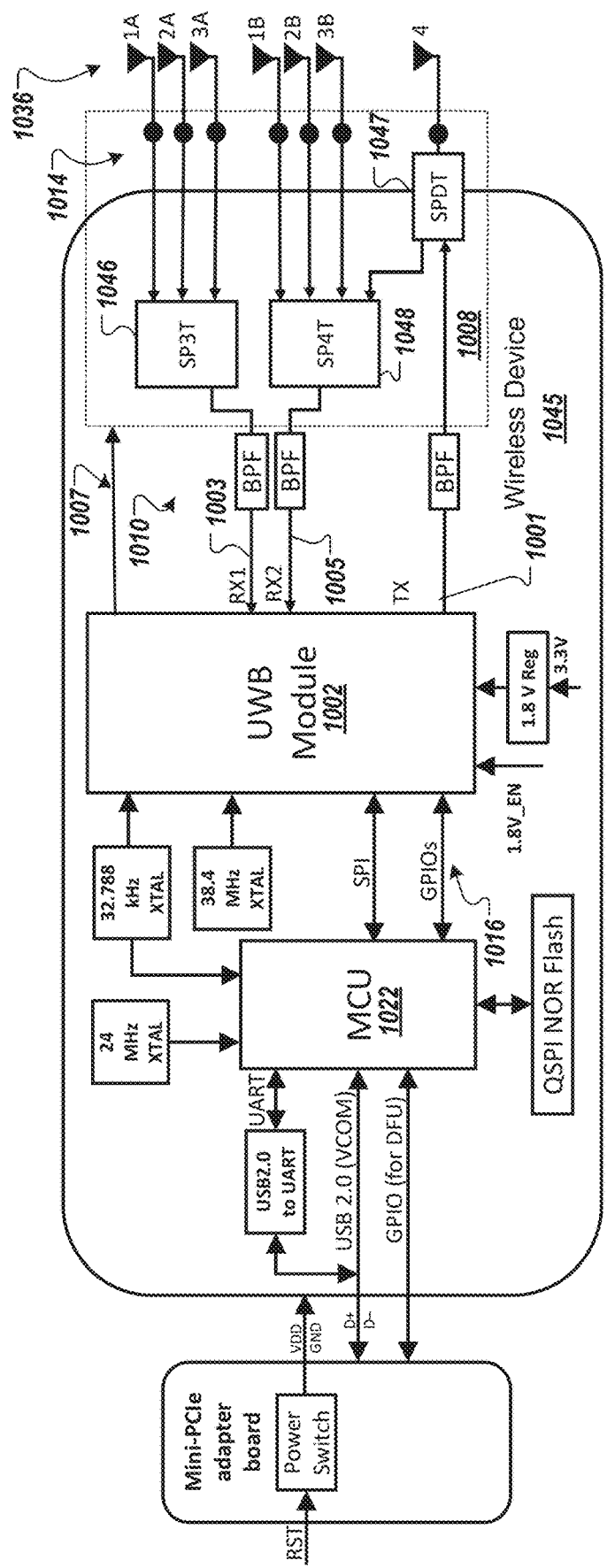
FIG. 10D is a block diagram of a wireless device with seven antennas and SPDT switches and a truth table for controlling the same, according to one embodiment.

FIG. 10D is a block diagram of a wireless device 1045 with seven antennas 1036 and three switches and a truth table for controlling the same, according to one embodiment. The wireless device 1045 is similar to wireless device 1030, as noted with similar reference numbers, except the wireless device 1045 includes specific switches in another switch configuration as another example of the RF switching circuitry 1008.

As illustrated, the switch configuration of the RF switching circuitry 1008 of FIG. 10D includes three switches 1046, 1048, and 1047. Switch 1046 is a single-pole, triple throw (SP3T) that is coupled to three of the seven antennas 1036 (1A, 2A, 3A) and one of the receive ports (RX1) of the UWB module 1002. Switch 1048 is a single-pole, quadruple throw (SP4T) that is coupled to four of the seven antennas 1036 (1B, 2B, 3B, 4) and one of the receive ports (RX2) of the UWB module 1002. Switch 1047 is coupled to the seventh of the seven antennas 1036, the switch 1048, and the transmit port (TX) of the UWB module 1002. The switches 1046, 1048, 1047 can be controlled by control signals 1007 as set forth in the truth table 1050.

The truth table 1050 includes the values of the control signals 1007 used to select different antenna pairs, such as 1A-1B, 2A-2B, 3A-3B, or select the seventh antennas for receive or transmit (RX4 or TX4).

Figure 10E:
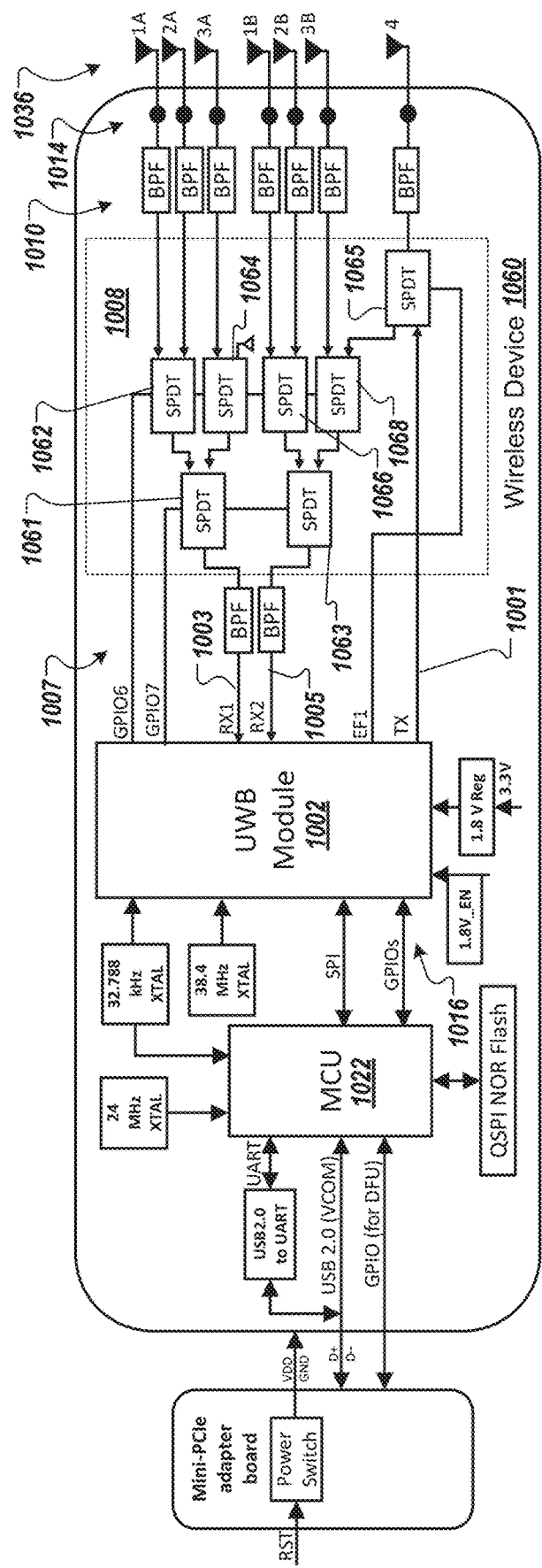
FIG. 10E is a block diagram of a wireless device with seven antennas and seven SPDT switches and a truth table for selecting multiple antenna pairs, according to one embodiment.

FIG. 10E is a block diagram of a wireless device 1060 with seven antennas and seven SPDT switches and a truth table for selecting multiple antenna pairs, according to one embodiment. The wireless device 1060 is similar to wireless device 1045, as noted with similar reference numbers, except the wireless device 1060 includes specific switches in another switch configuration as another example of the RF switching circuitry 1008.

As illustrated, the switch configuration of the RF switching circuitry 1008 of FIG. 10E includes four SPDT switches 1062, 1064, 1066, and 1068. Switch 1062 is coupled to two of the seven antennas 1036 (1A, 2A) and a fifth SPDT switch 1061. Switch 1064 is coupled to one of the seven antennas 1036 (3A) (and the other terminal being grounded), and the fifth SPDT switch 1061. Switch 1066 is coupled to two of the seven antennas 1036 (1B, 2B) and a sixth SPDT switch 1063. Switch 1068 is coupled to one of the seven antennas 1036 (3B), a seventh SPDT switch 1065, and the sixth SPDT switch 1063. The seventh SPDT switch 1065 is coupled to the transmit port of UWB module 1002 and a seventh of the seven antennas 1036. Bandpass filters can be coupled between the SPDT switches and the seven antennas 1036. Additional bandpass filters are coupled between the receive ports of the UWB module 1002 and the fifth and sixth SPDT switches 1061, 1063. The SPDT switches 1062, 1064, 1066, and 1068 are controlled by one of the control signals 1007 (GPIO6). Fifth and sixth SPDT switches 1061, 1063 are controlled by one of the control signals 1007 (GPIO7). The seventh SPDT switch 1065 is controlled by one of the control signals 1007 (EF1).

The truth table 1070 includes the values of the control signals 1007 used to select different antenna pairs, such as 1A-1B, 2A-2B, 3A-3B, or select the seventh antennas for receive or transmit (RX4 or TX4).

Figure 10F:
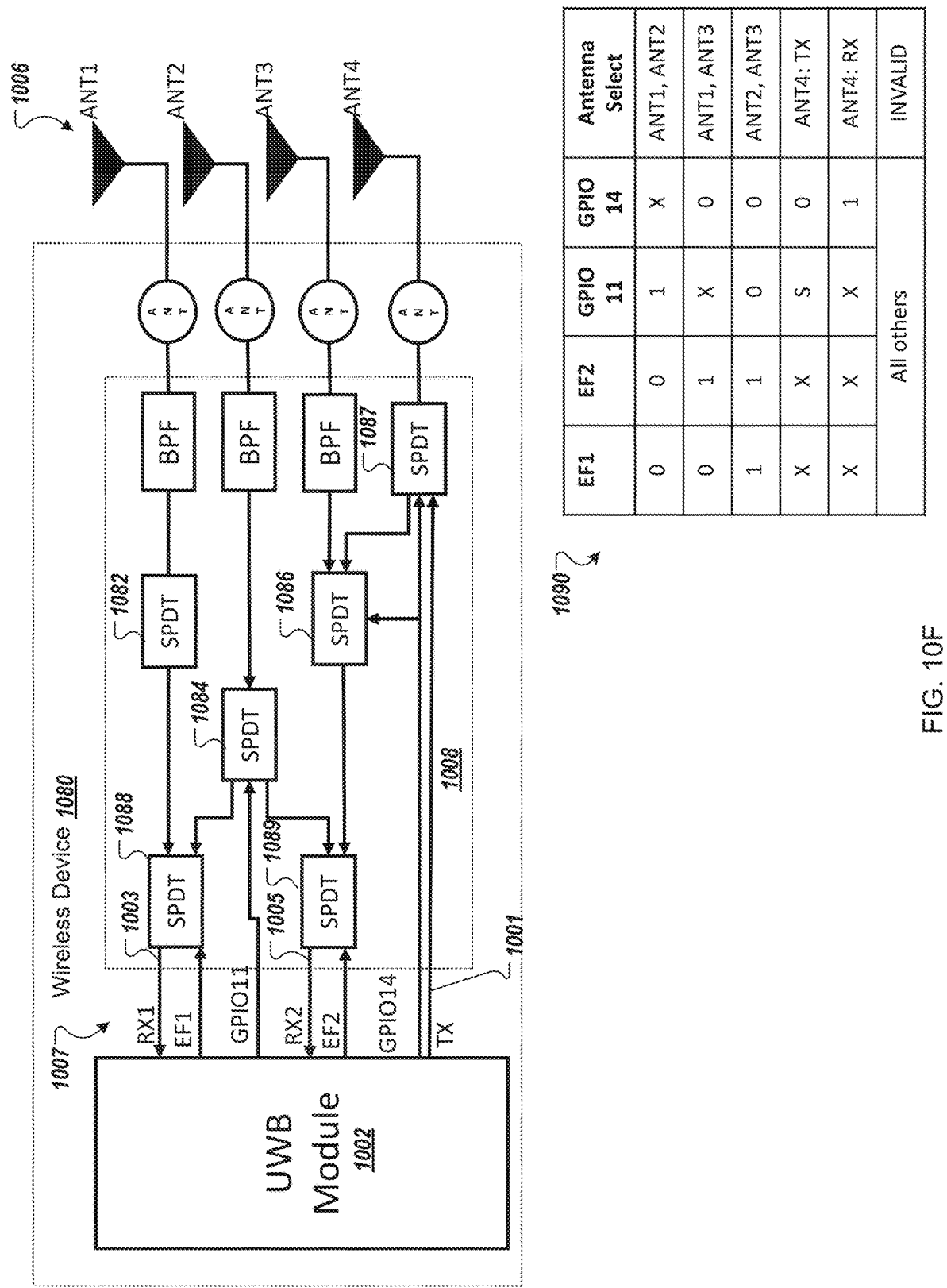
FIG. 10F is a block diagram of a wireless device with four antennas and six SPDT switches, and a truth table for selecting multiple antenna pairs, according to one embodiment.

FIG. 10F is a block diagram of a wireless device 1080 with four antennas and six SPDT switches, and a truth table for selecting multiple antenna pairs, according to one embodiment. The wireless device 1080 is similar to the wireless device 1000 of FIG. 10A, as noted with similar reference numbers, except the wireless device 1080 includes specific switches in another switch configuration as another example of the RF switching circuitry 1008.

As illustrated, the switch configuration of the RF switching circuitry 1008 of FIG. 10F includes five SPDT switches 1082, 1084, 1086, 1088, and 1089. A first SPDT switch 1082 is coupled to one of the four antennas 1006 (ANT1) and a fourth SPDT switch 1088. A second SPDT switch 1084 is coupled to one of the four antennas 1006 (ANT2) and the fourth SPDT switch 1088. The fourth SPDT switch 1088 is coupled to a first receive port (RX1) of the UWB module 1002 and is controlled by one of the control signals 1007 (EF1). A third SPDT switch 1086 is coupled to one of the four antennas 1006 (ANT3) and a fifth SPDT switch 1089. The fifth SPDT switch 1089 is coupled to a second receive port (RX2) of the UWB module 1002 and is controlled by one of the control signals 1007 (EF2). The third SPDT switch 1086 is coupled to a seventh SPDT switch 1087, coupled to one of the fourth antennas 1006 (ANT4). The seventh SPDT switch 1065 is coupled to the transmit port of UWB module 1002 and a seventh of the seven antennas 1036. The third SPDT switch 1086 and the seventh SPDT switch 1087 are controlled by one of the control signals 1007 (GPIO14). Bandpass filters can be coupled between the SPDT switches and the fourth antennas 1006.

The truth table 1090 includes the values of the control signals 1007 used to select different antenna pairs, such as ANT1-ANT2, ANT1-ANT3, ANT2-ANT3, or select the seventh antennas for receive or transmit (ANT4: TX, ANT4: RX).

Figure 11:
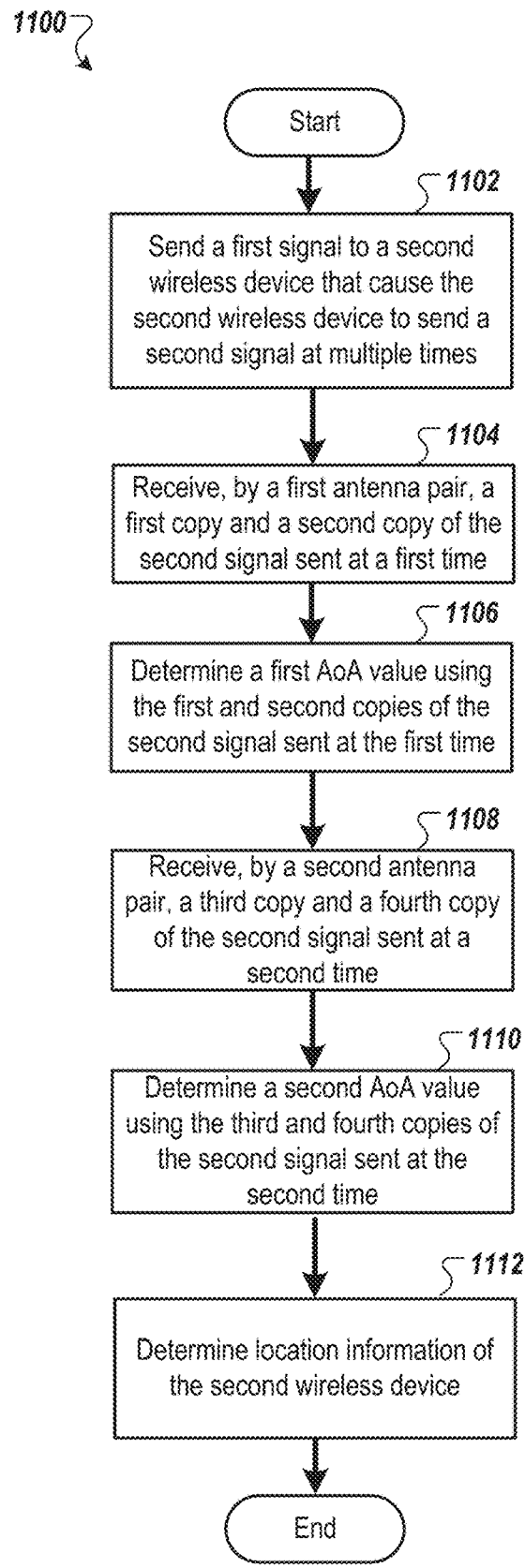
FIG. 11 is a flow diagram of a method of operating a wireless device to measure multiple AoA values, according to at least one embodiment.

FIG. 11 is a flow diagram of a method 1100 of operating a first wireless device to measure multiple AoA values according to at least one embodiment. The method 1100 may be performed by processing logic that comprises hardware (e.g., circuitry, dedicated logic, programmable logic, microcode, etc.), software, firmware, or a combination thereof. In one embodiment, the method 1100 may be performed by the first wireless device 102 of FIG. 1. In another embodiment, method 1100 is performed by the UWB radio 106 of FIG. 1. In another embodiment, method 1100 is performed by the UWB module 202 of UWB anchor device 200 of FIG. 2A. In another embodiment, method 1100 is performed by initiator 602 (or controller) or responder 908. In another embodiment, the method 1100 is performed by any wireless device described herein.

Referring back to FIG. 11, the processing logic of a first wireless device begins the method 1100 by sending a first signal to a second wireless device. The first signal comprises first data that causes the second wireless device to send a second signal multiple times (block 1102). By a first pair of antennas, the processing logic receives a first copy and a second copy of the second signal sent by the second wireless device at a first time (block 1104). The first pair of antennas includes a first FOV covering a first portion of an environment. The processing logic determines a first AoA value using a first phase difference of arrival between the first and second copies of the second signal sent by the second wireless device at the first time (block 1106). By a second pair of antennas, the processing logic receives a third copy and a fourth copy of the second signal sent by the second wireless device at a second time (block 1108). The second pair of antennas includes a second FOV covering a second portion of the environment. The processing logic determines a second AoA value using a second phase difference of arrival between the third and fourth copies of the second signal sent by the second wireless device at the second time (block 1110). The processing logic determines location information of the second wireless device in the environment (block 1112). The location information can include an identifier corresponding to either the first FOV or the second FOV in which the second wireless device is located and at least one of the first AoA value or the second AoA value.

In a further embodiment, the processing logic determines a schedule that defines an antenna pair associated with each time slot of a set of time slots in a ranging round, each of the set of time slots corresponding to one of the multiple times, in OWR with multi-AoA measurements in a ranging round mode. The first signal is a first ranging message and the second signal is a second ranging message.

In a further embodiment, the processing logic determines a schedule that defines an antenna pair associated with each time slot of a set of time slots in a ranging round, each of the set of time slots corresponding to one of the multiple times or one of the additional times, in a multi-mode DS-TWR with multiple AoA values in a ranging round. The first signal includes third data that cause a third wireless device to send a third signal at additional times. By the first pair of antennas, the processing logic receives a first copy and a second copy of the third signal sent by the third wireless device at a first time of the additional times. The processing logic determines a third AoA value using a third phase difference of arrival between the first and second copies of the third signal sent by the third wireless device at the first time of the additional times. The processing logic receives a third copy and a fourth copy of the third signal sent by the third wireless device at a second time of the additional times by the second pair of antennas. The processing logic determines a fourth AoA value using a fourth phase difference of arrival between the third and fourth copies of the third signal sent by the third wireless device at the second time of the additional times. Using the third AoA value and the fourth AoA value, the processing logic determines location information of the third wireless device in the environment. The location information of the third wireless device can include a second identifier corresponding to either the first FOV or the second FOV in which the third wireless device is located and at least one of the third AoA value or the fourth AoA value.

In a further embodiment, in different ranging sessions, the processing logic determines a schedule that defines a first antenna pair in a first ranging round of a first ranging session and a second antenna pair in a first ranging round of a second ranging session. The first ranging round of the first ranging session corresponds to the first time, and the first ranging round of the second ranging session corresponds to the second time.

In a further embodiment, in a ranging round for OWR with multiple AoA measurements, the processing logic receives the first and second copies of the second signal by receiving the first and second copies of the second signal over a UWB connection between the first wireless device and the second wireless device. The processing logic sends the first signal by sending the first signal over an OOB connection (e.g., BLE connection) between the first wireless device and the second wireless. It should be noted that the OOB connection is any non-UWB connection. The processing logic receives a third signal from the second wireless device over the UWB connection. The third signal includes second data that specifies the multiple times at which the second wireless device is to send the second signal. The processing logic determines a schedule that defines the first pair of antennas to receive the copies of the second signal sent by the second wireless device at a first time of the multiple times and the second pair of antennas to receive the copies of the second signal sent by the second wireless device at a second time of the multiple times.

Figure 12:
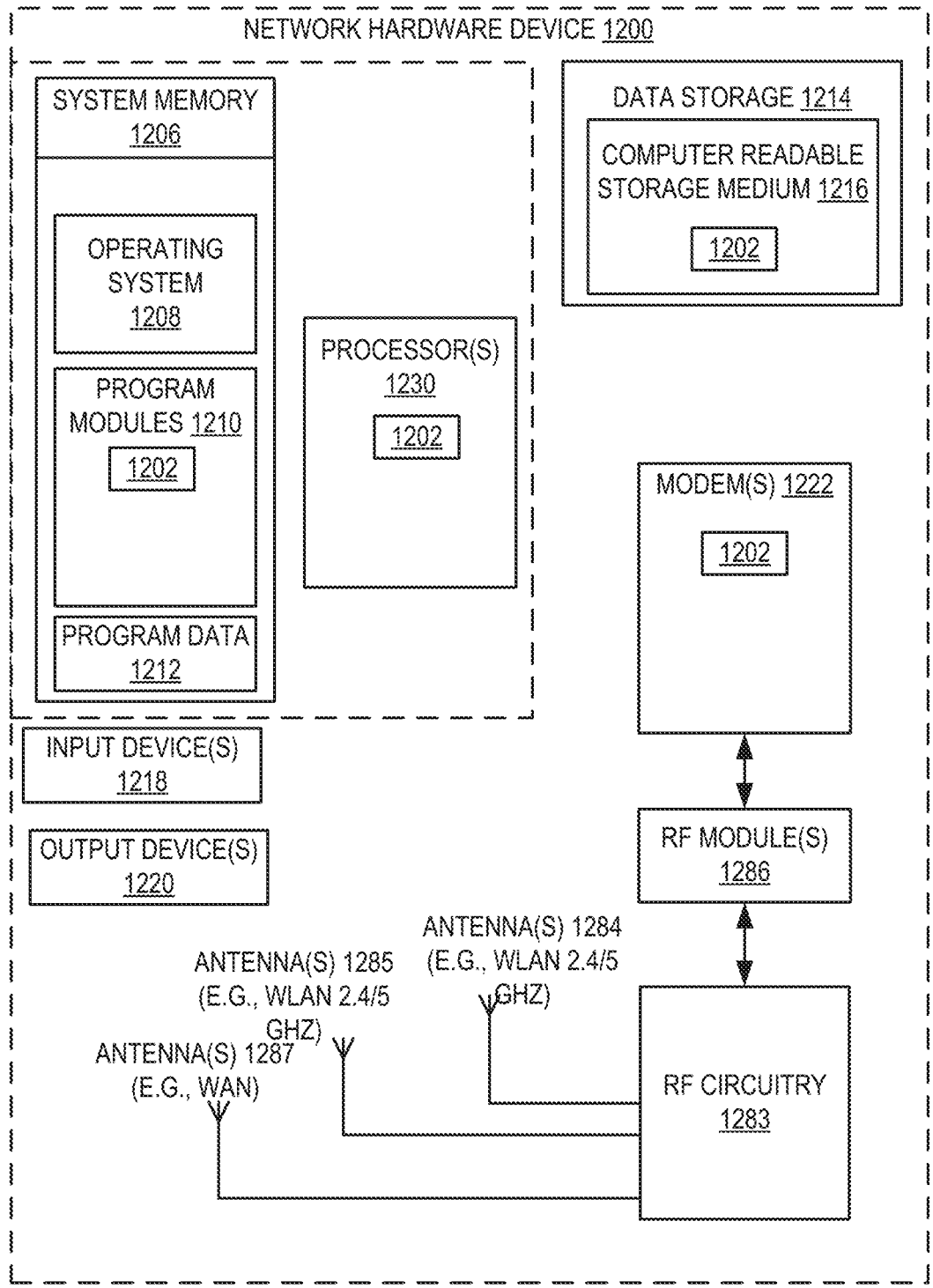
FIG. 12 is a block diagram of a wireless device for measuring multiple AoA values in UWB ranging, according to one embodiment.

FIG. 12 is a block diagram of a wireless device 1200 include antenna-pair switching logic 1202 for measuring multiple AoA values in UWB ranging, according to one embodiment. The wireless device 1200 may correspond to the mesh network devices described above with respect to FIGS. 1-12. Alternatively, the wireless device 1200 may be other electronic devices, as described herein. The antenna-pair switching logic 1202 can implement method 1100 of FIG. 11. The antenna-pair switching logic 1202 can implement the functionality of the UWB module as described herein, including receiving a command to measure multiple AoA values to expand the AoA coverage area of the wireless device 1200 as described herein.

The wireless device 1200 includes one or more processor(s) 1230, such as one or more CPUs, microcontrollers, field-programmable gate arrays, or other types of processors. The wireless device 1200 also includes system memory 1206, which may correspond to any combination of volatile and/or non-volatile storage mechanisms. The system memory 1206 stores information that provides operating system component 1208, various program modules 1210, program data 1212, and/or other components. In one embodiment, the system memory 1206 stores instructions of methods to control the operation of the wireless device 1200. The wireless device 1200 performs functions by using the processor(s) 1230 to execute instructions provided by the system memory 1206. In one embodiment, the program modules 1210 may include antenna-pair switching logic 1202. The antenna-pair switching logic 1202 may perform some of the operations of measuring multiple AoA values as described herein.

The wireless device 1200 also includes a data storage device 1214 that may be composed of one or more types of removable storage and/or one or more types of non-removable storage. The data storage device 1214 includes a computer-readable storage medium 1216 on which is stored one or more sets of instructions embodying any of the methodologies or functions described herein. Instructions for the program modules 1210 (e.g., antenna-pair switching logic 1202) may reside, completely or at least partially, within the computer-readable storage medium 1216, system memory 1206, and/or within the processor(s) 1230 during execution thereof by the wireless device 1200, the system memory 1206 and the processor(s) 1230 also constituting computer-readable media. The wireless device 1200 may also include one or more input devices 1218 (keyboard, mouse device, specialized selection keys, etc.) and one or more output devices 1220 (displays, printers, audio output mechanisms, etc.).

The wireless device 1200 further includes a modem 1222 to allow the wireless device 1200 to communicate via a wireless connection (e.g., such as provided by the wireless communication system) with other computing devices, such as remote computers, an item providing system, and so forth. The modem 1222 can be connected to one or more radio frequency (RF) modules 1286. The RF modules 1286 may be a WLAN module, a WAN module, PAN module, GPS module, or the like. The antenna structures (antenna(s) 1284, 1285, 1287) are coupled to the RF circuitry 1283, which is coupled to the modem 1222. The RF circuitry 1283 may include radio front-end circuitry, antenna-switching circuitry, impedance matching circuitry, or the like. The antennas 1284 may be GPS antennas, NFC antennas, other WAN antennas, WLAN or PAN antennas, or the like. The modem 1222 allows the wireless device 1200 to handle both voice and non-voice communications (such as communications for text messages, multimedia messages, media downloads, web browsing, etc.) with a wireless communication system. The modem 1222 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 1222 may generate signals and send these signals to the antenna(s) 1284 of a first type (e.g., WLAN 5 GHZ), antenna(s) 1285 of a second type (e.g., WLAN 2.4 GHz), and/or antenna(s) 1287 of a third type (e.g., WAN), via RF circuitry 1283, and RF module(s) 1286 as described herein. Antennas 1284, 1285, 1287 may be configured to transmit in different frequency bands and/or using different wireless communication protocols. The antennas 1284, 1285, 1287 may be directional, omnidirectional, or non-directional antennas. In addition to sending data, antennas 1284, 1285, 1287 may also receive data, which is sent to appropriate RF modules connected to the antennas. One of the antennas 1284, 1285, 1287 may be any combination of the antenna structures described herein.

In one embodiment, the wireless device 1200 establishes a first connection using a first wireless communication protocol, and a second connection using a different wireless communication protocol. The first wireless connection and second wireless connection may be active concurrently, for example, if a wireless device is receiving a media item from another wireless device via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band, and the second wireless connection is associated with a second resonant mode of the antenna structure that operates at a second frequency band. In another embodiment, the first wireless connection is associated with a first antenna structure, and the second wireless connection is associated with a second antenna. In other embodiments, the first wireless connection may be associated with content distribution within mesh nodes of the WMN, and the second wireless connection may be associated with serving a content file to a client consumption device, as described herein.

Though a modem 1222 is shown to control transmission and reception via the antenna (1284, 1285, 1287), the wireless device 1200 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An ultra-wideband (UWB) anchor device comprising:
   a host processor that executes an application that requests a location of a UWB tag device located in an environment of the UWB anchor device;
   an ultra-wideband (UWB) module coupled to the host processor, the UWB module comprising a UWB command interface (UCI), a first receive (RX) chain, and a second RX chain; and
   radio frequency (RF) switching circuitry coupled to the UWB module and at least three antennas, wherein the UWB module:
   receives a first command from the host processor via the UCI, the first command comprising a first indication of a first pair of two of the at least three antennas, the first pair having a first field of view (FOV) covering 120 degrees of the environment;
   sends a message to the UWB tag device that causes the UWB tag device to send successive messages to the UWB anchor device, each successive message at one of a plurality of time slots;
   controls the RF switching circuitry to couple a first antenna of the first pair to the first RX chain and a second antenna of the first pair to the second RX chain at a beginning of a first time slot of the plurality of time slots;
   receives, via the first pair during the first time slot, one of the successive messages from the UWB tag device;
   determines, using the one message received from the UWB tag device during the first time slot, a first angle-of-arrival (AoA) value of the UWB tag device;

receives a second command from the host processor via the UCI, the second command comprising a second indication of a second pair of two of the at least three antennas, the second pair being different than the first pair, the second pair having a second FOV covering 120 degrees of the environment;

controls the RF switching circuitry to couple a first antenna of the second pair to the first RX chain and a second antenna of the second pair to the second RX chain at a beginning of a second time slot of the plurality of time slots;

receives, via the second pair during the second time slot, one of the successive messages from the UWB tag device;

determines, using the one message received from the UWB tag device during the second time slot, a second AoA value of the UWB tag device;

determines location information of the UWB tag in the environment using the first AoA value and the second AoA value, the location information comprising an identifier corresponding to the first FOV or the second FOV in which the UWB tag device is located and at least one of the first AoA value or the second AoA value; and sends the location information to the host processor.

2. The UWB anchor device of claim 1, wherein:
the RF switching circuitry is coupled to six antennas; and
the UWB module:
receives a third command from the host processor via the UCI, the third command comprising a third indication of a third pair of two of the six antennas, the first pair having a third FOV covering 120 degrees of the environment;

the first FOV, the second FOV, and the third FOV cover 360 degrees of the environment;

controls the RF switching circuitry to couple a first antenna of the third pair to the first RX chain and a second antenna of the third pair to the second RX chain at a beginning of a third time slot of the plurality of time slots;

receives, via the third pair during the third time slot, one of the successive messages from the UWB tag device;

determines, using the one message received from the UWB tag device during the third time slot, a third AoA value of the UWB tag device; and determines the location information of the UWB tag in the environment using the first AoA value, the second AoA value, and the third AoA value, the location information comprising the identifier corresponding to the first FOV, the second FOV, or the third FOV in which the UWB tag device is located and at least one of the first AoA value, the second AoA value, or the third AoA value.

3. A first wireless device comprising:
a processor;
an ultra-wideband (UWB) module coupled to the processor, the UWB module comprising a first receive (RX) chain and a second receive (RX) chain; and
switching circuitry coupled to the UWB module and antennas, wherein the UWB module is to:
send a first signal to a second wireless device, the first signal comprising first data that causes the second wireless device to broadcast a second signal at a plurality of times;
receive an indication of a first pair of antennas, each antenna of the first pair selected by the processor to capture a first field of view for the first pair, wherein the first field of view is in a first direction and is equal to a sector size of an environment of the first wireless device;
at a first time of the plurality of times, cause the switching circuitry to couple a first antenna of the first pair to the first RX chain and a second antenna of the first pair to the second RX chain;
receive a first and a second copy of the second signal sent, at the first time, by the second wireless device;
determine, using the first and the second copies of the second signal, a first angle-of-arrival (AoA) value;
receive an indication of a second pair of antennas, each antenna of the second pair selected by the processor to capture a second field of view for the second pair, wherein the second field of view is in a second direction and is equal to the sector size of the environment of the first wireless device;
at a second time of the plurality of times, cause the switching circuitry to couple a first antenna of the second pair to the first RX chain and a second antenna of the second pair to the second RX chain;
receive a third copy and a fourth copy of the second signal sent, at the second time, by the second wireless device;
determine, using the third and the fourth copies of the second signal, a second AoA value; and
send at least one of the first AoA value or the second AoA value to the processor.

4. The first wireless device of claim 3, wherein the first wireless device is a UWB anchor device, and wherein the second wireless device is a UWB tag device.

5. The first wireless device of claim 3, wherein:
the UWB module receives a command from the processor, the command comprising second data that defines an antenna pair associated with each time slot of a plurality of time slots in a ranging round, each of the plurality of time slots corresponding to one of the plurality of times;
the UWB module sends one or more control signals to the switching circuitry based on the second data;
the first signal is a first ranging message; and
the second signal is a second ranging message.

6. The first wireless device of claim 5, wherein the first ranging message is a ranging control message (RCM), and the second ranging message is a ranging initiation message (RIM).

7. The first wireless device of claim 3, wherein:
the UWB module receives a command from the processor, the command comprising second data that defines an antenna pair associated with each time slot of a plurality of time slots in a ranging round, each of the plurality of time slots corresponding to one of the plurality of times or one of a second plurality of times;
the first signal is sent to a third wireless device, the first signal further comprising third data that causes the third wireless device to send a third signal at the second plurality of times;
cause the switching circuitry to couple the first pair of antennas to the UWB module at a first time of the second plurality of times to receive copies of the third signal sent, at the first time, by the third wireless device of the second plurality of times;
determine, using the copies of the third signal, a third AoA value; and
send the third AoA value to the processor.

8. The first wireless device of claim 7, wherein:
the first signal is a ranging control message (RCM) including the first data and the third data;
the second signal is a first ranging response message (RRM);
the third signal is a second RRM;
the UWB module sends a ranging initiation message (RIM) to the second wireless device and the third wireless device; and
the UWB module sends a Final message to the second wireless device and the third wireless device.

9. The first wireless device of claim 3, wherein:
the UWB module receives a command from the processor, the command comprising second data that defines an antenna pair associated with each time slot of a plurality of time slots in a ranging round, each of the plurality of time slots corresponding to one of the plurality of times;
the UWB module sends one or more control signals to the switching circuitry based on the second data;
the first signal is a first ranging message;
the second signal is a second ranging message;
the UWB module sends a third ranging message to the second wireless device;
the UWB module sends a fourth ranging message to the second wireless device; and
the first ranging message is a ranging control message (RCM), the second ranging message is a ranging response message (RRM), the third ranging message is a ranging initiation message (RIM), and the fourth ranging message is a Final message.

10. The first wireless device of claim 3, wherein:
the UWB module receives a first command from the processor, the first command comprising second data that defines a first antenna pair in a first ranging round of a first ranging session, the first ranging round of the first ranging session corresponding to the first time;
the UWB module sends one or more control signals to the switching circuitry based on the second data;
the UWB module receives a second command from the processor, the second command comprising third data that defines a second antenna pair in a first ranging round of a second ranging session, the first ranging round of the second ranging session corresponding to the second time; and
the UWB module sends one or more control signals to the switching circuitry based on the third data.

11. The first wireless device of claim 10, wherein:
the second data further defines the first antenna pair associated with a first set of time slots in the first ranging round of the first ranging session and a third antenna pair associated with a second set of time slots in the first ranging round of the first ranging session.

12. The first wireless device of claim 10, wherein:
the second data further defines a third antenna pair in a second ranging round of the first ranging session, the second ranging round of the first ranging session corresponding to a third time of the plurality of times; and
the first time, the second time, and the third time occur within a ranging block corresponding to at least the first ranging session comprising the first ranging session and the second ranging session.

13. The first wireless device of claim 3, wherein:
the UWB module receives a first command from the processor, the first command comprising second data that defines a first antenna pair in a first ranging round and a second antenna pair in a second ranging round, the first ranging round corresponding to the first time and the second ranging round corresponding to the second time;
the UWB module sends one or more control signals to the switching circuitry based on the second data at the first time; and
the UWB module sends one or more control signals to the switching circuitry based on the second data at the second time.

14. The first wireless device of claim 13, wherein the first ranging round and the second ranging round are consecutive ranging rounds in a same session.

15. The first wireless device of claim 3, wherein:
the UWB module receives the copies of the second signal over a UWB connection between the first wireless device and the second wireless device and send the first signal over a non-UWB connection between the first wireless device and the second wireless device;
the UWB module receives a third signal from the second wireless device over the UWB connection, the third signal comprising second data that specifies the plurality of times at which the second wireless device sends the second signal;
the UWB module sends the second data to the processor;
the UWB module receives a first command and a second command from the processor in response to sending the second data to the processor;
the first command comprises a first indication of the first pair of antennas to receive the copies of the second signal sent, at a first time of the plurality of times, by the second wireless device; and
the second command comprises a second indication of the second pair of antennas to receive the copies of the second signal sent, at a second time of the plurality of times, by the second wireless device.

16. A method of operating a first wireless device, the method comprising:
sending a first signal to a second wireless device, the first signal comprising first data that causes the second wireless device to send a second signal at a plurality of times;
receiving an indication of a first pair of antennas, each antenna of the first pair selected to capture a first field of view for the first pair, wherein the first field of view is in a first direction and is equal to a sector size of an environment of the first wireless device;
receiving, by the first pair of antennas of the first wireless device, a first copy and a second copy of the second signal sent, at a first time, by the second wireless device, the first pair of antennas comprising a first field of view (FOV) covering a first portion of an environment of the first wireless device, wherein a first antenna of a second pair of antennas coupled to a first receive (RX) chain of the first wireless device and a second antenna of the second pair coupled to a second receive (RX) chain of the first wireless device;
determining a first angle-of-arrival (AoA) value using the first and second copies of the second signal;
receiving an indication of the second pair of antennas, each antenna of the second pair selected to capture a second field of view for the second pair, wherein the second field of view is in a second direction and is equal to the sector size of the environment of the first wireless device;
receiving, by the second pair of antennas of the first wireless device, a third copy and a fourth copy of the second signal sent, at a second time, by the second wireless device, the second pair of antennas comprising a second FOV covering a second portion of the environment of the first wireless device, wherein a first antenna of the second pair coupled to the first RX chain of the first wireless device and a second antenna of the second pair coupled to the second RX chain of the first wireless device;

determining, the third and fourth copies of the second signal, a second AoA value using the third and fourth copies of the second signal; and determining location information of the second wireless device in the environment, wherein the location information comprises an identifier corresponding to either the first FOV or the second FOV in which the second wireless device is located and at least one of the first AoA value or the second AoA value.

17. The method of claim 16, further comprising:
determining a schedule that defines an antenna pair associated with each time slot of a plurality of time slots in a ranging round, each of the plurality of time slots corresponding to one of the plurality of times, wherein the first signal is a first ranging message and the second signal is a second ranging message.

18. The method of claim 16, further comprising:
determining a schedule that defines an antenna pair associated with each time slot of a plurality of time slots in a ranging round, each of the plurality of time slots corresponding to one of the plurality of times or one of a second plurality of times, wherein the first signal further comprises third data that cause a third wireless device to send a third signal at the second plurality of times;

receiving, by the first pair of antennas, a first copy and a second copy of the third signal sent, at a first time of the second plurality of times, by the third wireless device;

determining a third AoA value using the first and second copies of the third signal; and receiving, by the second pair of antennas, a third and a fourth copy of the third signal sent, at a second time of the second plurality of times, by the third wireless device;

determining a fourth AoA value using the third and fourth copies of the third signal; and determining location information of the third wireless device in the environment, wherein the location information of the third wireless device comprises a second identifier corresponding to either the first FOV or the second FOV in which the third wireless device is located and at least one of the third AoA value or the fourth AoA value.

19. The method of claim 16, further comprising:
determining a schedule that defines a first antenna pair in a first ranging round of a first ranging session and a second antenna pair in a first ranging round of a second ranging session, the first ranging round of the first ranging session corresponding to the first time and the first ranging round of the second ranging session corresponding to the second time.

20. The method of claim 16, wherein:
receiving the first and second copies of the second signal comprises receiving the first and second copies of the second signal over a UWB connection between the first wireless device and the second wireless device; and sending the first signal comprises sending the first signal over a non-UWB connection between the first wireless device and the second wireless device, and wherein the method further comprises:

receiving a third signal from the second wireless device over the UWB connection, the third signal comprising second data that specifies the plurality of times at which the second wireless device sends the second signal; and determining a schedule that defines the first pair of antennas to receive the copies of the second signal sent, at a first time of the plurality of times, by the second wireless device and the second pair of antennas to receive the copies of the second signal sent, at a second time of the plurality of times, by the second wireless device.

\* \* \* \* \*